US011157863B2

(12) United States Patent
Perez

(10) Patent No.: US 11,157,863 B2
(45) Date of Patent: Oct. 26, 2021

(54) PEER-BASED MOBILE COMPUTING ENTITY MANAGEMENT SYSTEM

(71) Applicant: United Parcel Service of America, Inc., Atlanta, GA (US)

(72) Inventor: Juan Perez, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 189 days.

(21) Appl. No.: 15/412,964

(22) Filed: Jan. 23, 2017

(65) Prior Publication Data

US 2018/0174093 A1 Jun. 21, 2018

Related U.S. Application Data

(60) Provisional application No. 62/437,490, filed on Dec. 21, 2016.

(51) Int. Cl.
  *G06Q 10/08* (2012.01)
  *G06F 16/9537* (2019.01)
  *G06Q 50/28* (2012.01)

(52) U.S. Cl.
  CPC ....... *G06Q 10/083* (2013.01); *G06F 16/9537* (2019.01); *G06Q 10/0833* (2013.01);
  (Continued)

(58) Field of Classification Search
  CPC .............. G06Q 10/083; G06Q 10/0833; G06F 17/3087
  (Continued)

(56) References Cited

U.S. PATENT DOCUMENTS 8,615,473 B2   12/2013   Spiegel et al.
9,656,805 B1 *  5/2017   Evans ................ G05B 19/4182
(Continued)

FOREIGN PATENT DOCUMENTS

WO   WO-2014025925 A1 *  2/2014   ............. G01C 21/00

OTHER PUBLICATIONS

Patel, Riddhi. "What Can We Learn from ORION: UPS' Route Planning Software" Published Aug. 6, 2020. https://www.upperinc.com/ups-route-planning-software/#solve-travel-problem (Year: 2020).*
(Continued)

*Primary Examiner* — George Chen
*Assistant Examiner* — Lisa Ma
(74) *Attorney, Agent, or Firm* — Shook, Hardy & Bacon, LLP

(57) ABSTRACT

Various embodiments are directed to systems and methods for engaging a service provider to perform a delivery service to redirect a shipment to be delivered to an alternative intended destination upon receipt of a redirection request. Based on a monitored current location of a last mile delivery vehicle scheduled to deliver the shipment to an initial intended destination, a computing entity monitors the location of available service providers capable of meeting the last mile delivery vehicle to pick up the shipment and transport the shipment to the alternative intended destination. The computing entity may engage one of the service providers by transmitting a signal to a mobile computing entity carried by the service provider and may monitor the service provider's progress in meeting the last mile delivery vehicle and transporting the shipment to the alternative intended destination.

16 Claims, 7 Drawing Sheets

(52) U.S. Cl.
CPC ... *G06Q 10/0834* (2013.01); *G06Q 10/08355*
(2013.01); *G06Q 50/28* (2013.01)
(58) Field of Classification Search
USPC .......................................................... 705/330
See application file for complete search history.

(56) References Cited

U.S. PATENT DOCUMENTS

| | | |
|---|---|---|
| 2006/0282277 A1 | 12/2006 | Ng |
| 2012/0030133 A1 | 2/2012 | Rademaker |
| 2012/0072363 A1 | 3/2012 | Spiegel et al. |
| 2012/0173448 A1* | 7/2012 | Rademaker ............ G06Q 50/28 |
| | | 705/338 |
| 2012/0303542 A1 | 11/2012 | Marcus et al. |
| 2014/0046590 A1* | 2/2014 | Needham ............... G01C 21/36 |
| | | 701/522 |
| 2014/0317005 A1 | 10/2014 | Balwani |
| 2015/0046083 A1* | 2/2015 | Maitra .................... H04L 67/12 |
| | | 701/465 |
| 2015/0227882 A1* | 8/2015 | Bhatt ............... G06Q 10/08355 |
| | | 705/330 |
| 2016/0042312 A1 | 2/2016 | Siebrecht et al. |
| 2016/0071056 A1 | 3/2016 | Ellison et al. |
| 2016/0140497 A1 | 5/2016 | Bhaskaran et al. |
| 2016/0225115 A1 | 8/2016 | Levy et al. |
| 2017/0083862 A1 | 3/2017 | Loubriel |
| 2018/0299897 A1* | 10/2018 | Cashier ................ G05D 1/0088 |

OTHER PUBLICATIONS

International Search Report and Written Opinion received for PCT Patent Application No. PCT/US2017/067597, dated Mar. 23, 2018, 12 pages.

* cited by examiner

PEER-BASED MOBILE COMPUTING ENTITY MANAGEMENT SYSTEM

CROSS-REFERENCE TO RELATED APPLICATIONS

This patent application claim priority from Provisional Application Ser. No. 62/437,490, filed on Dec. 21, 2016, which is incorporated herein by reference in its entirety.

BACKGROUND

Generally, shipments/items are delivered to a destination location identified at the time the shipment/item is initiated at a shipment origin. Often, a shipment/item is given to a carrier at the shipment origin and the carrier transports the shipment/item from the shipment origin to the destination. The shipment/item may be directed through one or more carrier sort locations between the shipment origin and the destination and ultimately, the shipment/item is placed onto a last-mile delivery vehicle at a final sort location for delivery to the destination location.

Historically, various concepts have been developed enabling a shipment/item to be redirected and thereby delivered to an alternative destination by directing the shipment/item to an alternative final sort location and/or placing the shipment/item onto a different last mile delivery vehicle while at the final sort location. For example, commonly owned U.S. patent application Ser. No. 13/174,306, filed Jul. 1, 2011 describes concepts enabling an intended package recipient to request that a shipment/item is redirected and delivered to a particular carrier location where the shipment/item is held until the recipient is ready to pick-up the shipment/item.

However, shippers and recipients desire additional shipment options to facilitate final delivery of a shipment/item to a desired location. Accordingly, a need exists for concepts enabling shippers and recipients to further customize delivery of shipments/items during all stages of delivery.

BRIEF SUMMARY

Various embodiments enable shippers and recipients to request various location specific services are performed with respect to one or more shipments/items. For example, shippers and/or recipients may request to redirect shipments/items to alternative delivery locations selected by the shipper and/or recipient during the last mile delivery of the shipment/item to an original delivery location. Accordingly, while the shipment/item is on a last mile delivery vehicle for delivery to an initial intended destination (but before delivery to the initial intended destination), the shipper and/or recipient may request to redirect the shipment/item to an alternative intended destination. In various embodiments, the carrier may determine whether the alternative delivery location satisfies applicable criteria, and may request that a service provider meet the last mile delivery vehicle to obtain the shipment/item and deliver the shipment/item to the alternative delivery location. Accordingly, various embodiments may identify appropriate service providers available to meet the last mile delivery vehicle and may identify appropriate meet points and meet times to facilitate the shipment/item handoff without requiring the last mile delivery vehicle to deviate significantly from an assigned route.

Various embodiments are directed to a method for engaging a service provider to perform a location-specific service involving an item. In various embodiments, the method comprising steps for: receiving, via the central computing entity, a service request corresponding to at least one item located on a vehicle, wherein the service request identifies a requested service involving the at least one item and wherein the at least one item is located on a vehicle traversing an assigned vehicle route; monitoring, via the central computing entity and based at least in part on location data received from the vehicle, the current location of the vehicle relative to the assigned vehicle route to identify an untraversed portion of the assigned vehicle route; monitoring, via the central computing entity, the current location of one or more service providers based at least in part on service provider location data received in real time from mobile computing entities carried by each of the one or more service providers; based at least in part on the identified untraversed portion of the assigned vehicle route, identifying, via the central computing entity, one or more potential meet locations and corresponding potential meet times, wherein the potential meet locations are located along the untraversed portion of the assigned vehicle route and the corresponding potential meet times are each identified based at least in part on an estimated time of arrival of the vehicle at the one or more potential meet locations while the vehicle travels along the untraversed portion of the assigned vehicle route; comparing, via the central computing entity, the received service provider location data against the one or more potential meet locations and corresponding meet times to identify one or more eligible service providers, wherein the eligible service providers are identified as capable of traveling to at least one potential meet location by a corresponding potential meet time; electronically communicating with a service provider computing entity associated with one of the eligible service providers to engage the eligible service provider to perform the requested service for the at least one item; and transmitting, via the central computing entity, one or more signals to the vehicle and the mobile computing entity carried by the engaged service provider indicating a meet location and corresponding meet time identified as one of the potential meet locations for which the engaged service provider is capable of traveling to by the corresponding potential meet time.

In various embodiments, the method comprises further steps for generating identity verification data to enable verification of the identity of the service provider at the meet location; and transmitting the identity verification data to at least one of the delivery vehicle or the service provider computing entity carried by the engaged service provider. Moreover, the identity verification data may be configured to enable a virtual handshake between the delivery vehicle and the service provider computing entity carried by the engaged service provider.

In various embodiments, the method further comprises steps for receiving data indicating that the item has been transferred to the engaged service provider; and monitoring the location of the engaged service provider while the engaged service provider transports the item. In various embodiments, the meet location may be a predefined stop along the delivery route. Moreover, in certain embodiments, transmitting one or more signals to the delivery vehicle comprises steps for transmitting one or more signals to a mobile computing entity carried by a delivery vehicle operator associated with the delivery vehicle.

In certain embodiments, monitoring the location of one or more available service providers comprises: querying a database of item data corresponding to a plurality of items to identify characteristics of the at least one item; querying a database of available service providers based at least in part on a portion of the item data for the at least one item to identify one or more service providers qualified to perform the requested service involving the at least one item; and monitoring the location of one or more available service providers qualified to perform the requested service involving the at least one item. Moreover, in certain embodiments, the requested service comprises transporting the at least one item to an alternative intended destination.

Various embodiments are directed to a system for engaging a service provider to perform a location-specific service involving an item. In certain embodiments, the system comprising one or more memory storage areas and one or more computer processors, the system configured to: receive, via the one or more computer processors, a service request corresponding to at least one item located on a vehicle, wherein the service request identifies a requested service involving the at least one item and wherein the at least one item is located on a vehicle traversing an assigned vehicle route; monitor, via the one or more computer processors and based at least in part on location data received from the vehicle, the current location of the vehicle relative to the assigned vehicle route to identify an untraversed portion of the assigned vehicle route; monitor, via the one or more computer processors, the current location of one or more service providers based at least in part on service provider location data received in real time from mobile computing entities carried by each of the one or more service providers; based at least in part on the identified untraversed portion of the assigned vehicle route, identify, via the one or more computer processors, one or more potential meet locations and corresponding potential meet times, wherein the potential meet locations are located along the untraversed portion of the assigned vehicle route and the corresponding potential meet times are each identified based at least in part on an estimated time of arrival of the vehicle at the one or more potential meet locations while the vehicle travels along the untraversed portion of the assigned vehicle route; compare, via the one or more computer processors, the received service provider location data against the one or more potential meet locations and corresponding meet times to identify one or more eligible service providers, wherein the eligible service providers are identified as capable of traveling to at least one potential meet location by a corresponding potential meet time; electronically communicate with a service provider computing entity associated with one of the eligible service providers to engage the eligible service provider to perform the requested service for the at least one item; and transmit, via the one or more computer processors, one or more signals to the vehicle and the mobile computing entity carried by the engaged service provider indicating a meet location and corresponding meet time identified as one of the potential meet locations for which the engaged service provider is capable of traveling to by the corresponding potential meet time.

In various embodiments, the system may be further configured to generate identity verification data to enable verification of the identity of the service provider at the meet location; and transmit the identity verification data to at least one of the delivery vehicle or the service provider computing entity carried by the engaged service provider. Moreover, in various embodiments, the identity verification data is configured to enable a virtual handshake between the delivery vehicle and the service provider computing entity carried by the engaged service provider.

In certain embodiments, the system may be further configured to receive data indicating that the item has been transferred to the engaged service provider; and monitor the location of the engaged service provider while the engaged service provider transports the item. In further embodiments, the meet location is a predefined stop along the delivery route. Moreover, in certain embodiments, transmitting one or more signals to the delivery vehicle comprises transmitting one or more signals to a mobile computing entity carried by a delivery vehicle operator associated with the delivery vehicle.

In various embodiments, monitoring the location of one or more available service providers comprises: querying a database of item data corresponding to a plurality of items to identify characteristics of the at least one item; querying a database of available service providers based at least in part on a portion of the item data for the at least one item to identify one or more service providers qualified to perform the requested service involving the at least one item; and monitoring the location of one or more available service providers qualified to perform the requested service involving the at least one item. Moreover, in certain embodiments, the requested service comprises transporting the at least one item to an alternative intended destination.

Various embodiments are directed to a computer program product comprising at least one non-transitory computer-readable storage medium having computer-readable program code portions stored therein. In certain embodiments, the computer readable program code portions may comprise: an executable portion configured for receiving a service request corresponding to at least one item located on a vehicle, wherein the service request identifies a requested service involving the at least one item and wherein the at least one item is located on a vehicle traversing an assigned vehicle route; an executable portion configured for monitoring, based at least in part on location data received from the vehicle, the current location of the vehicle relative to the assigned vehicle route to identify an untraversed portion of the assigned vehicle route; an executable portion configured for monitoring the current location of one or more service providers based at least in part on service provider location data received in real time from mobile computing entities carried by each of the one or more service providers; an executable portion configured for, based at least in part on the identified untraversed portion of the assigned vehicle route, identifying one or more potential meet locations and corresponding potential meet times, wherein the potential meet locations are located along the untraversed portion of the assigned vehicle route and the corresponding potential meet times are each identified based at least in part on an estimated time of arrival of the vehicle at the one or more potential meet locations while the vehicle travels along the untraversed portion of the assigned vehicle route; an executable portion configured for comparing the received service provider location data against the one or more potential meet locations and corresponding meet times to identify one or more eligible service providers, wherein the eligible service providers are identified as capable of traveling to at least one potential meet location by a corresponding potential meet time; an executable portion configured for electronically communicating with a service provider computing entity associated with one of the eligible service providers to engage the eligible service provider to perform the requested service for the at least one item; and an executable portion configured for transmitting one or more signals to the vehicle and the mobile computing entity carried by the engaged service provider indicating a meet location and corresponding meet time identified as one of the potential meet locations for which the engaged service provider is capable of traveling to by the corresponding potential meet time.

In certain embodiments, the computer program product further comprises an executable portion configured for generating identity verification data to enable verification of the identity of the service provider at the meet location; and an executable portion configured for transmitting the identity verification data to at least one of the delivery vehicle or the service provider computing entity carried by the engaged service provider. Moreover, in various embodiments, the identity verification data is configured to enable a virtual handshake between the delivery vehicle and the service provider computing entity carried by the engaged service provider. In certain embodiments, the computer program product further comprises an executable portion configured for receiving data indicating that the item has been transferred to the engaged service provider; and an executable portion configured for monitoring the location of the engaged service provider while the engaged service provider transports the item. In certain embodiments, the meet location is a predefined stop along the delivery route.

In various embodiments, transmitting one or more signals to the delivery vehicle comprises steps for transmitting one or more signals to a mobile computing entity carried by a delivery vehicle operator associated with the delivery vehicle. Moreover, in certain embodiments, monitoring the location of one or more available service providers comprises querying a database of item data corresponding to a plurality of items to identify characteristics of the at least one item; querying a database of available service providers based at least in part on a portion of the item data for the at least one item to identify one or more service providers qualified to perform the requested service involving the at least one item; and monitoring the location of one or more available service providers qualified to perform the requested service involving the at least one item. Moreover, in certain embodiments, the requested service comprises transporting the at least one item to an alternative intended destination.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
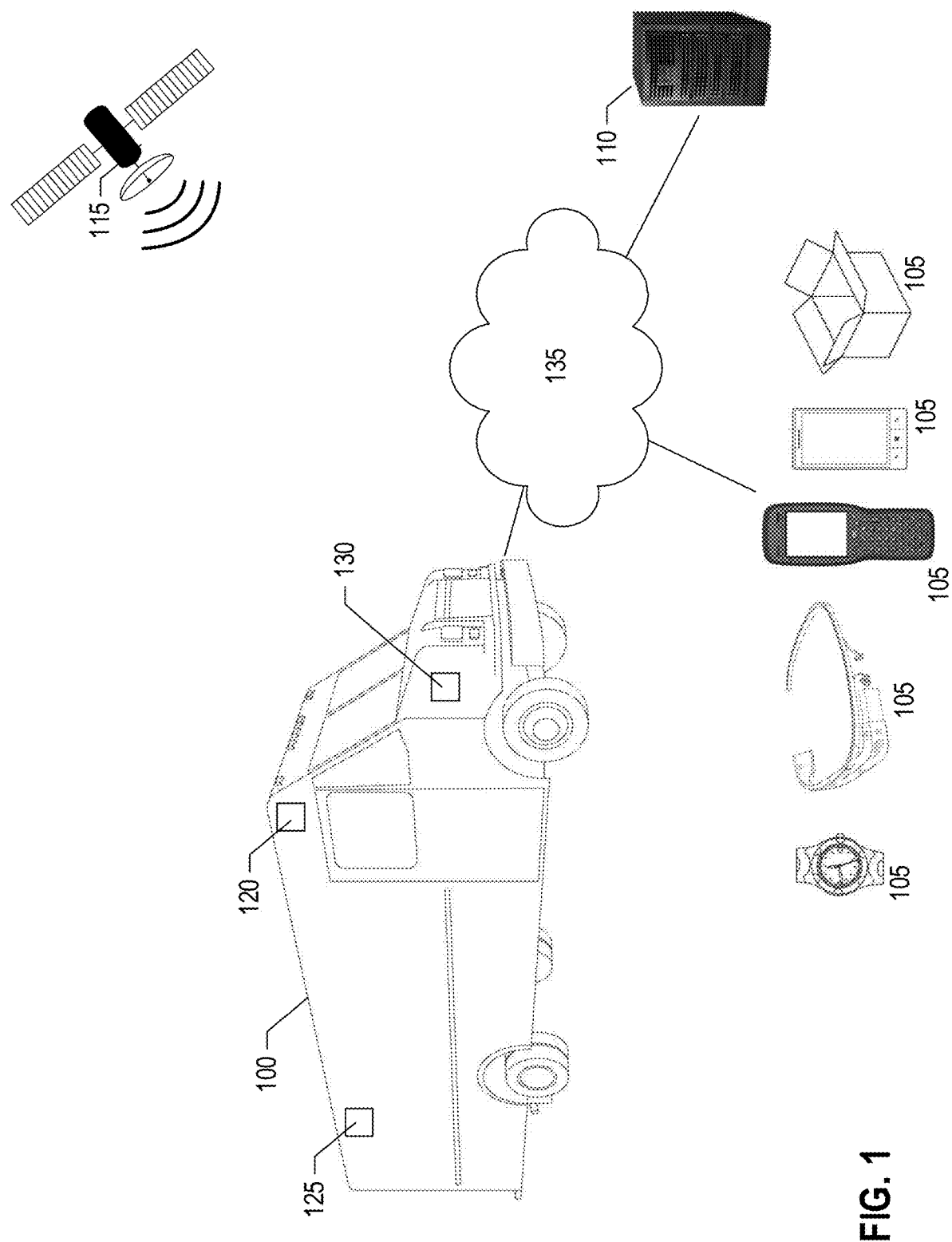
FIG. 1 is a diagram of a system that can be used to practice various embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to concepts enabling a shipped item/shipment to be redirected from an initial intended destination to an alternative intended destination while the item/shipment is on a last mile delivery vehicle moving along a route toward the initial intended destination, and before the shipment/item is delivered to the initial intended destination. Thus, various embodiments enable item/shipment redirection during a greater portion of a shipped item/shipment's delivery path than previously possible. Accordingly, various embodiments comprise one or more central computing entities configured to receive requests from users (e.g., intended recipients and/or shippers) to redirect a shipment/item to an alternative intended destination, to identify the current location of the shipment/item within the carrier's logistics network, and to generate appropriate signals to effect redirection of the shipment/item such that the shipment/item is not delivered to the initial intended destination and is instead redirected to the alternative intended destination.

In various embodiments, shipment/item redirection is one of a plurality of potential location-specific services that may be performed via one or more service providers in accordance with embodiments discussed herein. Accordingly, upon receiving a request for a locations-specific service for a particular shipment/item (e.g., shipment/item redirection) in the possession of the carrier, the central computing entity performs various processes to determine the appropriate methodology for effecting the requested service, based at least in part on the current status and/or location of the shipment/item within the carrier's logistics network and/or the relative location of the alternative intended destination relative to the initial intended destination (if applicable). For example, upon determining that the shipment/item is being transported between sort locations, or upon determining that the shipment/item is within a sort location, the central computing entity may flag electronic information/data associated with the shipment (e.g., Package Level Detail, "PLD") to inform handling personnel to perform the location-specific service (e.g., to redirect the shipment/item toward the alternative intended destination (e.g., redirect the shipment/item to a different delivery vehicle)).

Upon determining that the shipment/item is currently on a last mile delivery vehicle for final delivery to the initial intended destination when the service request to redirect a shipment/item is received, the central computing entity may compare the relative locations of the initial intended destination and the alternative intended destination (e.g., by comparing the relative locations stored as map information/data and/or location information/data) to determine the most appropriate method to redirect the shipment/item. If the initial and alternative intended destinations satisfy applicable criteria (e.g., within a threshold distance, the request is received before a cutoff time, the initial and alternative intended destinations are not along a common delivery route, and/or the like), the central computing entity may utilize location information/data (e.g., GPS information/ data) to identify an appropriate service provider and to generate a request to one or more service providers to retrieve the shipment/item from the last mile delivery vehicle at a determined meet point and time and to deliver the shipment/item to the alternative intended destination. For example, the central computing entity may request a peer-based delivery service (e.g., Uber, UberEats, Lyft, GetMe, and/or the like) to assign a particular service provider to redirect the shipment/item to the alternative intended destination.

As yet other examples, upon receiving the request to redirect the shipment/item to an alternative intended destination, the central computing entity may determine that the originally assigned delivery vehicle (e.g., the last mile delivery vehicle currently containing the shipment/item) may perform delivery at the alternative intended destination, and accordingly the central computing entity may modify the assigned delivery route for the delivery vehicle to effect delivery of the shipment/item at the alternative intended destination instead of the initial intended destination. As yet another example, the central computing entity may determine that the alternative intended destination and the initial intended destination do not satisfy applicable criteria (e.g., the initial and alternative intended destination locations may be beyond a threshold distance from one another) and accordingly the central computing entity may flag the electronic information/data associated with the shipment/item to inform the delivery vehicle operator to return the shipment/item to a sort facility to redirect the shipment/item to the alternative intended destination.

Accordingly, various embodiments enable redirection of a shipment/item to an alternative intended destination while the shipment/item is on a last mile delivery vehicle and without requiring the shipment/item to be rerouted through a carrier sort location and onto another last mile delivery vehicle at the carrier sort location. By utilizing one or more service providers (e.g., peer-based service providers), various embodiments enable shipment/item redirection during a greater portion of a shipment travel path between an origin and a destination than previously available. Shipments/items need not follow defined delivery routes preassigned to delivery vehicles during the delivery process (which may create significant delays in delivering shipments/items if a redirection request is to be effected), and instead shipments/items may be redirected from a preassigned delivery route for a particular delivery vehicle to an alternative intended destination that is not located along the preassigned delivery route by providing a service provider to pickup the shipment/item from the delivery vehicle and transport the shipment/item to the alternative intended destination.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more vehicles 100, one or more mobile computing entities 105, one or more central computing entities 110, one or more Global Positioning System (GPS) satellites 115, one or more location sensors 120, one or more telematics sensors 125, one or more information/data collection devices 130, one or more networks 135, one or more user computing entities 140 (not shown), and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, the term vehicle 100 is used generically. For example, a vehicle 100 may be a manned or an unmanned tractor, truck, car, motorcycle, moped, Segway, bicycle, golf cart, hand truck, cart, trailer, tractor and trailer combination, van, flatbed truck, vehicle, drone, airplane, helicopter, boat, barge, and/or any other form of object for moving or transporting people and/or items (e.g., one or more packages, parcels, bags, containers, loads, crates, items banded together, vehicle parts, pallets, drums, the like, and/or similar words used herein interchangeably). In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100. In various embodiments, a service provider 100a as discussed herein may be embodied as, comprise, and/or be associated with a vehicle.

Figure 2:
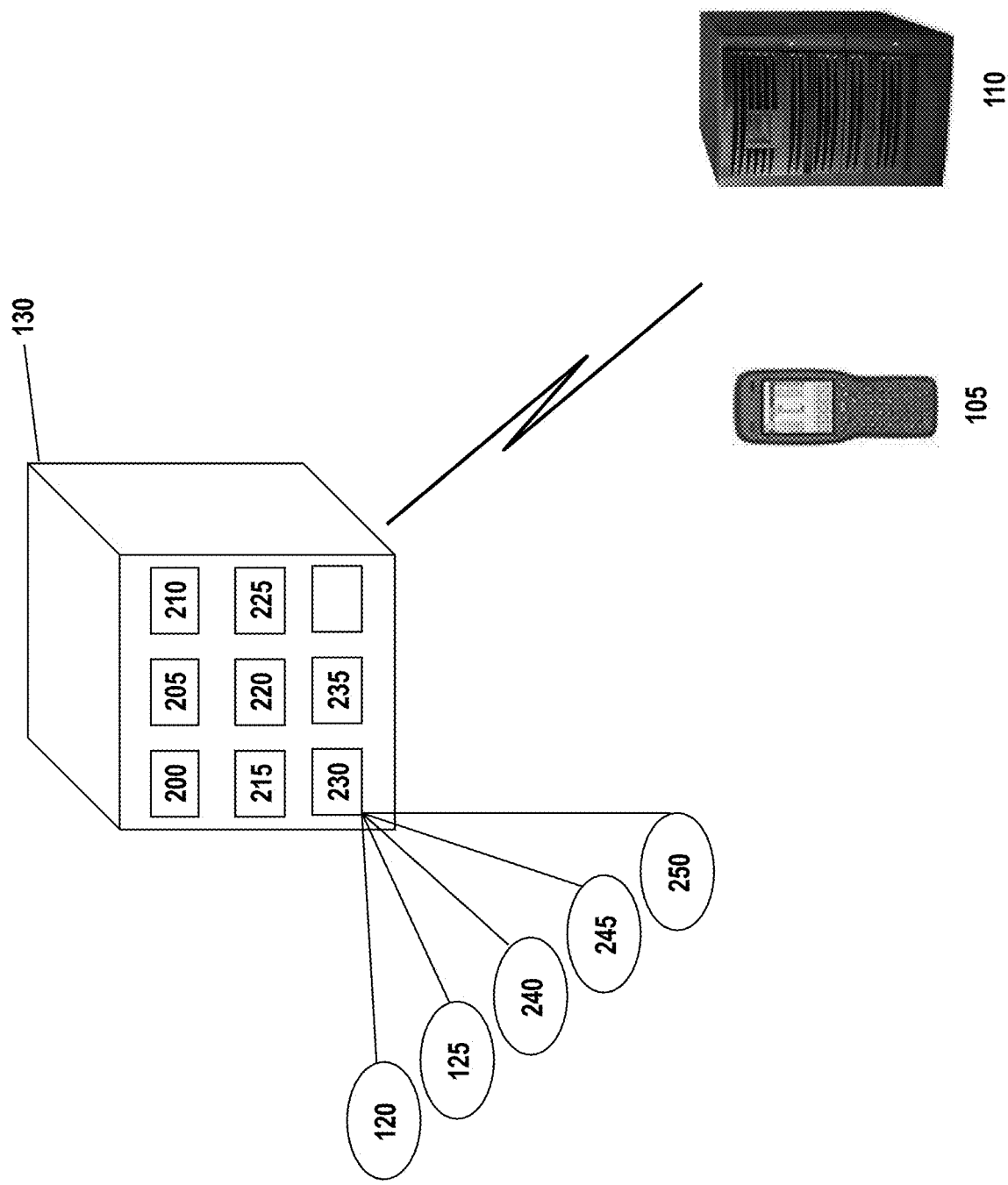
FIG. 2 is a diagram of an information/data collection device that may be used in association with certain embodiments of the present invention.

FIG. 1 shows one or more computing entities, devices, and/or similar words used herein interchangeably that are associated with the vehicle 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a vehicle 100. The information/data collection device 130 may collect telematics information/data (including location information/data) and transmit/send the information/data to the mobile computing entity 105, the central computing entity 110, and/or various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending information/data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection device 130.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the central computing entity 110, the information/data collection device 130, mobile computing entity 105, and/or similar computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed information/data, emissions information/data, RPM information/data, tire pressure information/data, oil pressure information/data, seat belt usage information/data, distance information/data, fuel information/data, idle information/data, and/or the like (e.g., referred to herein as telematics information/data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) information/data, and/or meteorological information/data (e.g., referred to herein as telematics information/data).

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle systems and sensors. The ECM 245 may further have information/data processing capability to collect and present telematics information/data to the J-Bus (which may allow transmission to the information/data collection device 130), and output standard vehicle diagnostic codes when received from a vehicle's J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

b. Exemplary Central Computing Entity

Figure 3:
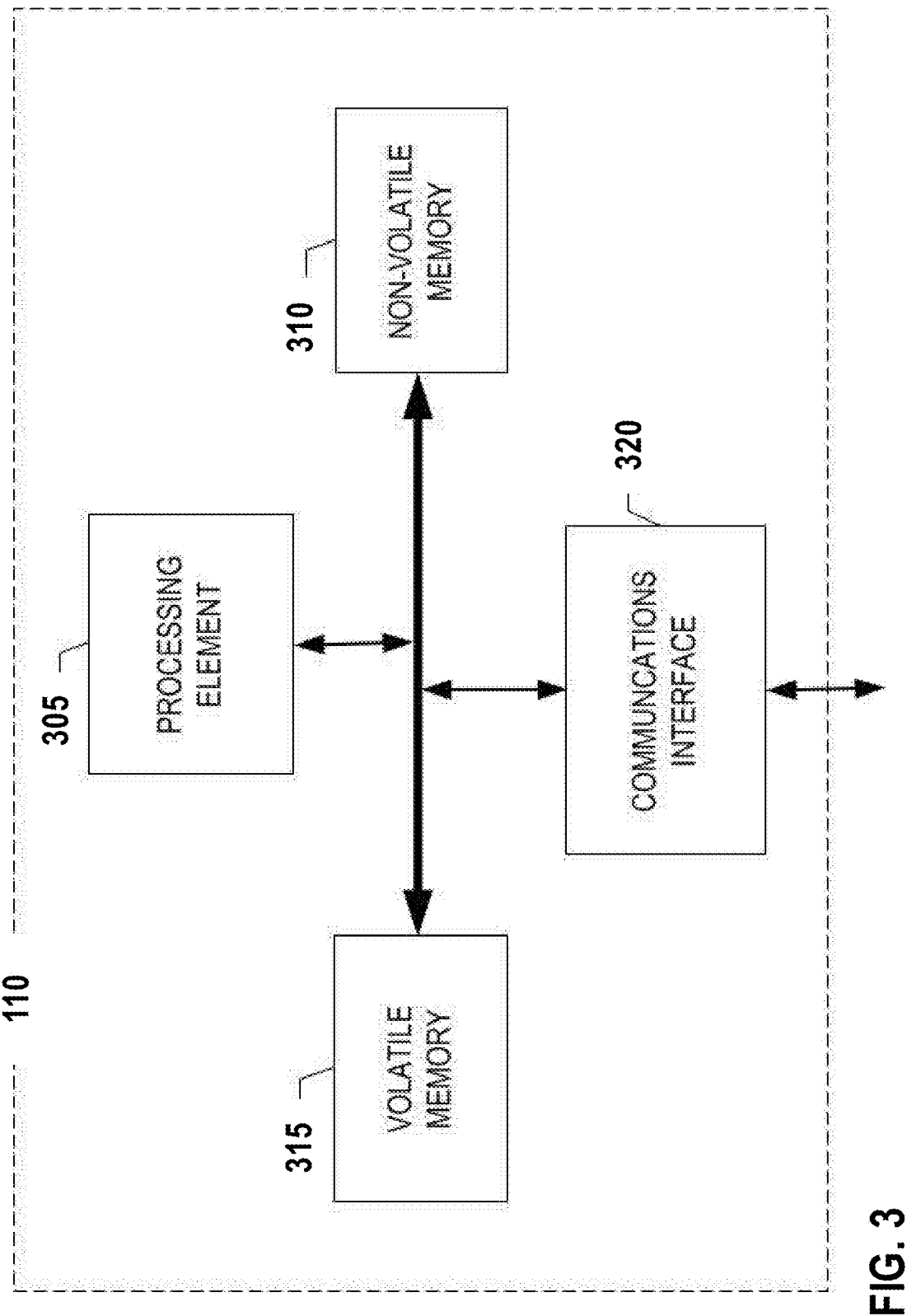
FIG. 3 is a schematic of a central computing entity in accordance with certain embodiments of the present invention.

FIG. 3 provides a schematic of a central computing entity 110 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the central computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the central computing entity 110 may communicate with vehicles 100, mobile computing entities 105, and/or the like.

As shown in FIG. 3, in one embodiment, the central computing entity 110 may include or be in communication with one or more processing elements 305 (also referred to as processors, processing circuitry, and/or similar terms used herein interchangeably) that communicate with other elements within the central computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the central computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, information/data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the central computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, information/data, applications, programs, program modules, scripts, source code, object code, byte code, compiled code, interpreted code, machine code, executable instructions, and/or the like being executed by, for example, the processing element 305. Thus, the databases, database instances, database management system entities, information/data, applications, programs, program modules, scripts, source code, object code, byte code, compiled code, interpreted code, machine code, executable instructions, and/or the like may be used to control certain aspects of the operation of the central computing entity 110 with the assistance of the processing element 305 and operating system.

As indicated, in one embodiment, the central computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the central computing entity 110 may communicate with computing entities or communication interfaces of the vehicle 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the central computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the central computing entity 110 may include or be in communication with one or more input elements, such as a keyboard input, a mouse input, a touch screen/display input, audio input, pointing device input, joystick input, keypad input, and/or the like. The central computing entity 110 may also include or be in communication with one or more output elements (not shown), such as audio output, video output, screen/display output, motion output, movement output, and/or the like.

As will be appreciated, one or more of the central computing entity's 110 components may be located remotely from other central computing entity 110 components, such as in a distributed system. Furthermore, one or more of the components may be combined and additional components performing functions described herein may be included in the central computing entity 110. Thus, the central computing entity 110 can be adapted to accommodate a variety of needs and circumstances.

c. Exemplary Mobile Computing Entity

Figure 4:
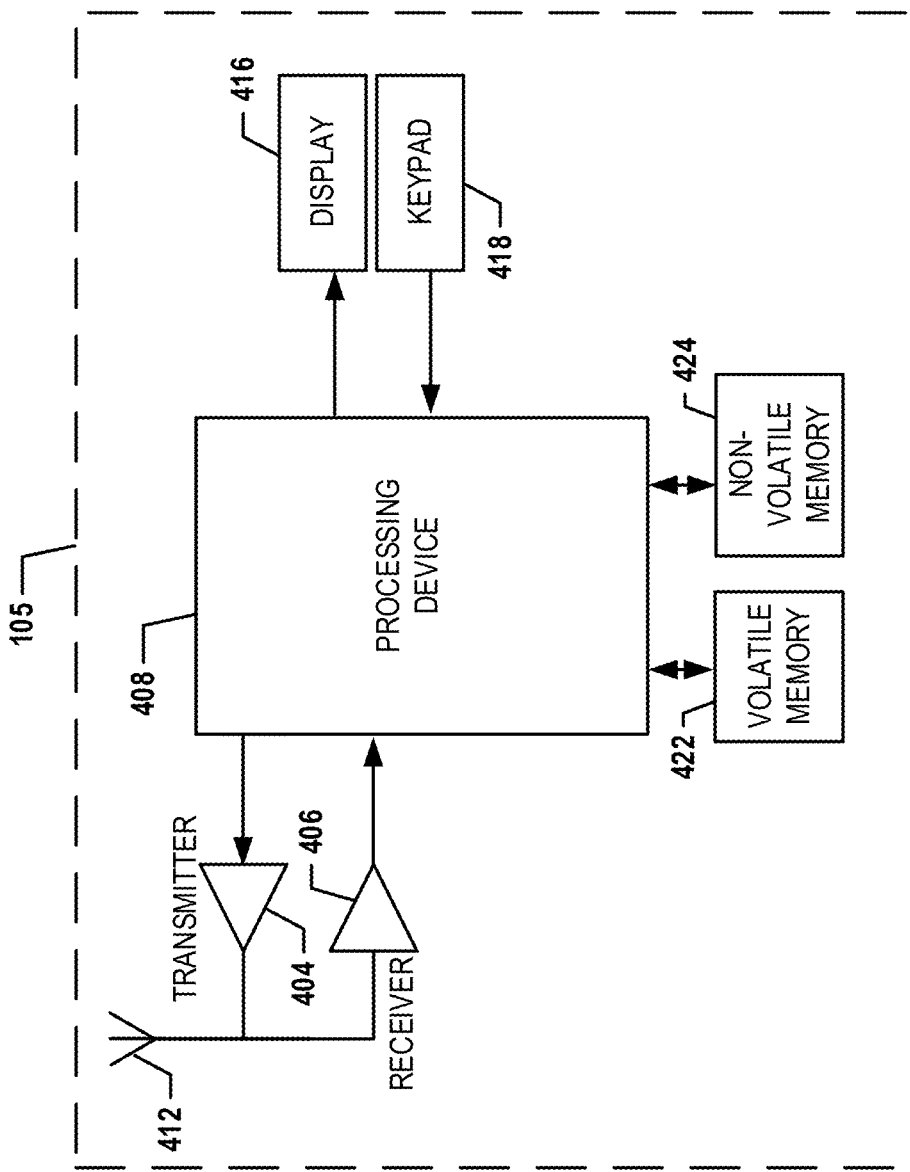
FIG. 4 is a schematic of a mobile computing entity in accordance with certain embodiments of the present invention.

FIG. 4 provides an illustrative schematic representative of a mobile computing entity 105 that can be used in conjunction with embodiments of the present invention. In one embodiment, the mobile computing entities 105 may include one or more components that are functionally similar to those of the central computing entity 110 and/or as described below. As will be recognized, mobile computing entities 105 can be operated by various parties, including operators of vehicles 100. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, central computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive information/data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics information/data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the mobile computing entity 105.

In various embodiments, the mobile computing entity 105 may comprise one or more payment processing entities, such as one or more magnetic card readers, one or more NFC readers, one or more chipped-card readers, and/or the like. The mobile computing entity 105 may be configured to receive data from a central computing entity 110 indicative of an amount to be paid (e.g., an amount owed for one or more services, products, and/or the like), and may be configured to transmit payment data to the central computing entity 110 once received from a customer. In various embodiments, the mobile computing entity 105 may be configured to process payments locally (e.g., based on transmissions with one or more banking institutions to obtain payment approval for various credit accounts, debit accounts, and/or the like), however, in certain embodiments, the mobile computing entity 105 may be configured to transmit unprocessed payment information to the central computing entity 110 for processing. In various embodiments, the mobile computing entity 105 may be configured to encrypt payment information received from a customer. The encrypted payment information may be stored locally (e.g., temporarily) and/or the encrypted payment information may be transmitted to the central computing entity 110. In various embodiments, the central computing entity 110 may store an encryption key configured to enable the central computing entity 110 to decrypt received payment information prior to processing the same. However, in various embodiments, the mobile computing entity 105 may be configured to generate and/or transmit an encryption key to the central computing entity 110. In various embodiments, the encryption key may be provided to the central computing entity 110 in a separate transmission from the encrypted payment information. However, in certain embodiments, the encrypted payment information and the encryption key may be transmitted in a single transmission.

d. Exemplary User Computing Entity

In one embodiment, the user computing entities 140 may each include one or more components that are functionally similar to those of the central computing entity 110 and/or the mobile computing entity 105. For example, in one embodiment, each of the user computing entities 140 may include: (1) a processing element that communicates with other elements via a system interface or bus; (2) a user interface; (3) transitory and non-transitory memory; and (4) a communications interface. As previously noted, the user computing entity 140 may comprise a user interface. For example, the user interface may be an application, browser, user interface, dashboard, webpage, and/or similar words used herein interchangeably executing on and/or accessible via the user computing entity 140 to interact with and/or cause display of information/data from the central computing entity 110 and/or the mobile computing entity 105, as described herein. These architectures are provided for exemplary purposes only and are not limiting to the various embodiments.

e. Exemplary Service Provider Computing Entity

In various embodiments, a service provider computing entity may be embodied as a mobile computing entity 105, a user computing entity, and/or the like. The service provider computing entity may be associated with a service provider, which may provide one or more location-specific services for one or more shipments/item (e.g., transportation services from a last mile delivery vehicle 100 to an alternative intended destination), as discussed in greater detail herein. The service provider computing entity may facilitate selection of a service provider for a location-specific service/task by providing location information/data indicative of the current location of the service provider (e.g., determined based on a location determining aspect incorporated in the service provider computing entity) and/or availability information/data. The location information/data and/or availability information/data may be provided from the service provider computing entity in real-time, such that the central computing entity 110 uses current and/or dynamic information/data associated with a service provider when selecting a service provider.

Accordingly, the service provider computing entity may be configured to perform one or more functions to facilitate coordination of performance of a location-specific service, which may comprise a handoff of a shipment/item to the service provider, navigation and tracking of the service provider (and the shipment/item) as the service provider moves to the alternative intended destination, and verification of the identity of the service provider and that the service provider successfully delivers the shipment/item to the alternative intended destination. Such functionality may be performed by a software program (e.g., application) operating on the service provider computing entity. The software program may be configured to access one or more firmware and/or hardware features of the service provider computing entity, such as a location determining feature (e.g., a GPS device), a security feature (e.g., a fingerprint reader), a camera, and/or the like.

In various embodiments, the service provider computing entity may be configured to communicate with a central computing entity 110 and/or a third party computing entity (e.g., a peer based management computing entity). The service provider computing entity may be configured to transmit information/data indicative of the current status and/or availability of the service provider (e.g., on duty and available, on duty and busy, off duty, and/or the like) such that the central computing entity 110 (and/or third party computing entity) may determine whether the service provider is available to perform a location-specific service (e.g., to transport a shipment/item). In various embodiments, the service provider computing entity may be configured to update the service provider status upon receipt of user input from the service provider, and/or automatically based at least in part on a predetermined availability schedule and/or based on information/data indicating whether the service provider is currently assigned to a particular task (e.g., delivering a shipment/item).

Moreover, the service provider computing entity may be configured to provide location information/data indicative of its current location to the service provider computing entity 110 (and/or third party computing entity). In various embodiments, the service provider computing entity may be configured to provide the location information/data only while the service provider is available and/or performing a task in association with the central computing entity. For example, the service provider computing entity may be configured to share location information/data (e.g., generated by a location determining aspect, such as a GPS device) with the central computing entity 110 and/or third party computing entity only while the service provider status is set to "On Duty—Available," "On Duty—Busy," and/or the like. In such embodiments, the service provider computing entity may not share location information/data with the central computing entity when the service provider is unavailable or otherwise not working with the central computing entity (e.g., when the service provider status is set to "Off Duty"). As will be discussed in greater detail herein, the location information/data shared with the central computing entity 110 while the service provider is available may be utilized to determine whether the service provider is eligible to perform a location-specific service (e.g., delivery of a shipment/item) and/or may be utilized to track the location of the service provider (e.g., as a proxy for the location of a shipment/item carried by the service provider). In certain embodiments, the service provider computing entity may be configured to continuously and/or periodically transmit location information/data indicative of the current location of the service provider computing entity to the central computing entity. For example, the service provider computing entity may continuously provide updated location information/data to the central computing entity while the service provider is transporting a shipment/item to an alternative intended destination.

In various embodiments, the central computing entity 110 (and/or a third party computing entity) may be configured to provide and/or transmit one or more notifications to the service provider computing entity relating to tasks, deliveries, and/or the like assigned to the service provider by the central computing entity 110. For example, the service provider computing entity may be configured to generate, provide, transmit, and/or display a notification to the service provider upon receipt of information/data from the central computing entity indicating that the service provider has been selected to perform a location specific service. In various embodiments, the service provider computing entity may be configured to receive user input indicating whether the service provider is willing to accept the assigned task, and to transmit a response to the central computing entity 110 indicating whether the service provider accepts the task. In such embodiments, the central computing entity 110 (and/or third party computing entity) may transmit a service request notification to the service provider computing entity requesting input indicating whether the service provider is willing to accept the service request. In various embodiments, the service provider computing entity may be configured to automatically transmit a response to the central computing entity 110 if no user input is received within a predefined time period after receipt of the notification. For example, if no user input is received by the service provider computing entity prior to the expiration of a predefined period of time after receipt of a notification indicating the service provider has been assigned to a particular task, the service provider computing entity may be configured to transmit a response indicating that the service provider has rejected the task. As yet another example, the service provider computing entity may be configured to automatically transmit a response indicating that the service provider has accepted the task after the expiration of a predefined period of time.

Moreover, as will be discussed in greater detail herein, the service provider computing entity may be configured to perform one or more service provider identity verification processes, for example, during a shipment/item handoff. As will be discussed herein, the service provider computing entity may be utilized to verify the identity of a service provider scheduled to perform a location-specific task, such as delivering a shipment/item from a last mile delivery vehicle 100 to an alternative destination location. For example, the service provider computing entity may be configured to generate and/or receive one or more identity verification data, such as verification codes (e.g., barcodes, QR codes, Maxicodes, alphanumeric strings, symbols, and/or the like), to perform a virtual handshake with one or more additional computing entities (e.g., a mobile computing entity carried by a last mile delivery vehicle operator), and/or the like.

In various embodiments, the service provider computing entity may be configured to facilitate delivery verifications by the service provider. For example, the service provider computing entity may be configured to accept input (e.g., user input) indicating that the service provider delivered the shipment/item to the alternative intended destination. In various embodiments, the service provider computing entity may be configured to verify the delivery of the shipment/item based on one or more delivery verification criteria. For example, the service provider computing entity may be configured to verify the location of the service provider computing entity relative to the location of the alternative intended destination (e.g., based on location information/data, such as GPS signals), may receive user input from the service provider indicating that the shipment/item was delivered, may receive photographic input indicating that shipment/item was delivered, and/or the like. In various embodiments, the service provider computing entity may be configured to utilize a plurality of delivery verification criteria. For example, the service provider computing entity may be configured to determine the location of the service provider computing entity relative to the location of the alternative destination location at the time user input (or other input) is received to indicate that the shipment/item was delivered.

As yet other embodiments, the service provider computing entity may be configured to receive image input (e.g., via a camera on the service provider computing entity) of one or more aspects of the alternative intended destination to verify that the service provider visited the alternative intended destination. For example, the service provider computing entity may instruct the service provider to photograph a street number associated with the alternative intended destination, a door associated with the service provider computing entity, and/or the like. As yet another example, the service provider computing entity may be configured to instruct the service provider to take a screenshot of the service provider computing entity while the service provider computing entity displays an image of the shipment/item at the alternative intended destination and a map display showing the current location of the service provider computing entity at the alternative intended destination.

As yet another example, the service provider computing entity may be configured to capture a signature of an intended recipient while the service provider is delivering the shipment/item at the alternative intended destination. The service provider computing entity may be configured to capture an image of the intended recipient's signature (e.g., via a camera, via writing on an input device of the service provider computing entity, and/or the like).

The service provider computing entity may be configured to transmit the delivery verification information/data to the central computing entity (e.g., directly and/or via a third party computing entity). As discussed herein, the central computing entity may be configured to store the delivery verification information/data in the PLD information/data corresponding to the delivered shipment/item, and/or to transmit information/data to the service provider computing entity indicating the service provider has completed the delivery task.

Like the described mobile computing entity 105, the service provider computing entity may comprise one or more payment processing entities, such as one or more magnetic card readers, one or more NFC readers, one or more chipped-card readers, and/or the like. In various embodiments, the service provider computing entity may comprise one or more payment processing algorithms (such as encryption algorithms) as a portion of a computer program stored on the service provider computing entity. For example, the computer program product enabling communications between the service provider computing entity and the central computing entity 110 may additionally comprise features for processing payments received from various customers.

III. Exemplary System Operation

Figure 5:
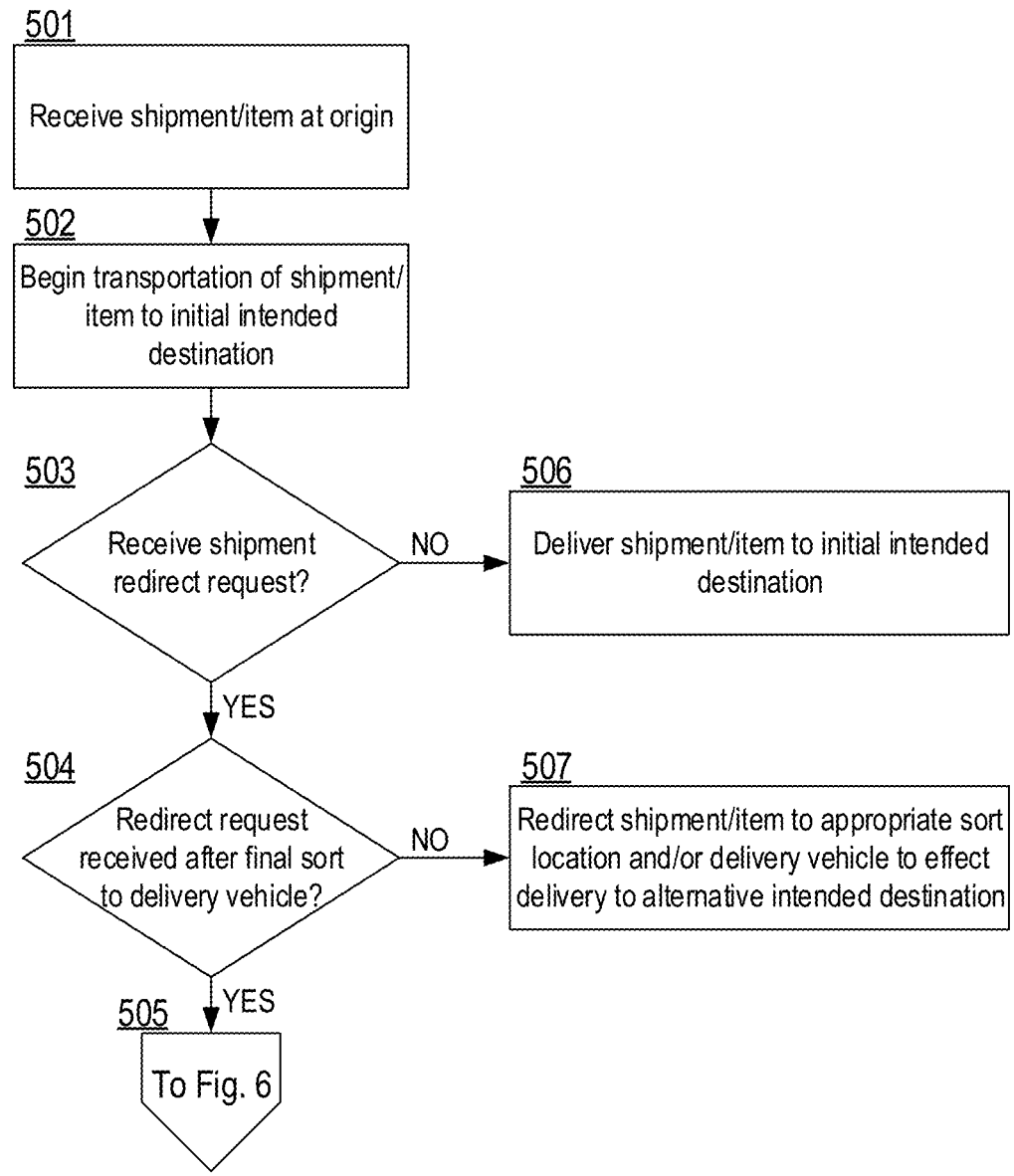
FIG. 5 is a flowchart illustrating operations and processes that can be used in accordance with various embodiments of the present invention.
Figure 6:
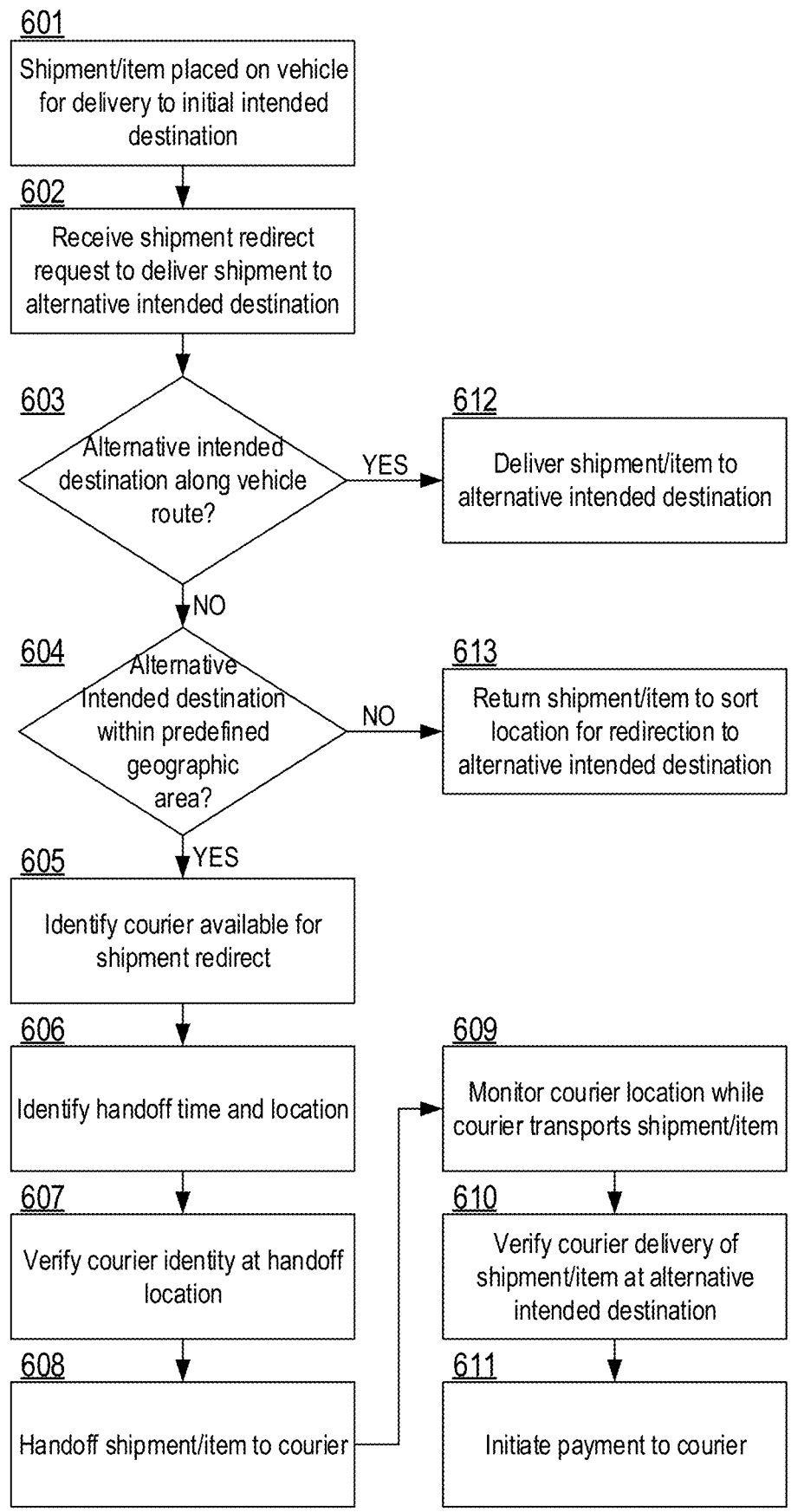
FIG. 6 is an additional flowchart illustrating additional operations and processes that can be used in accordance with various embodiments of the present invention.
Figure 7:
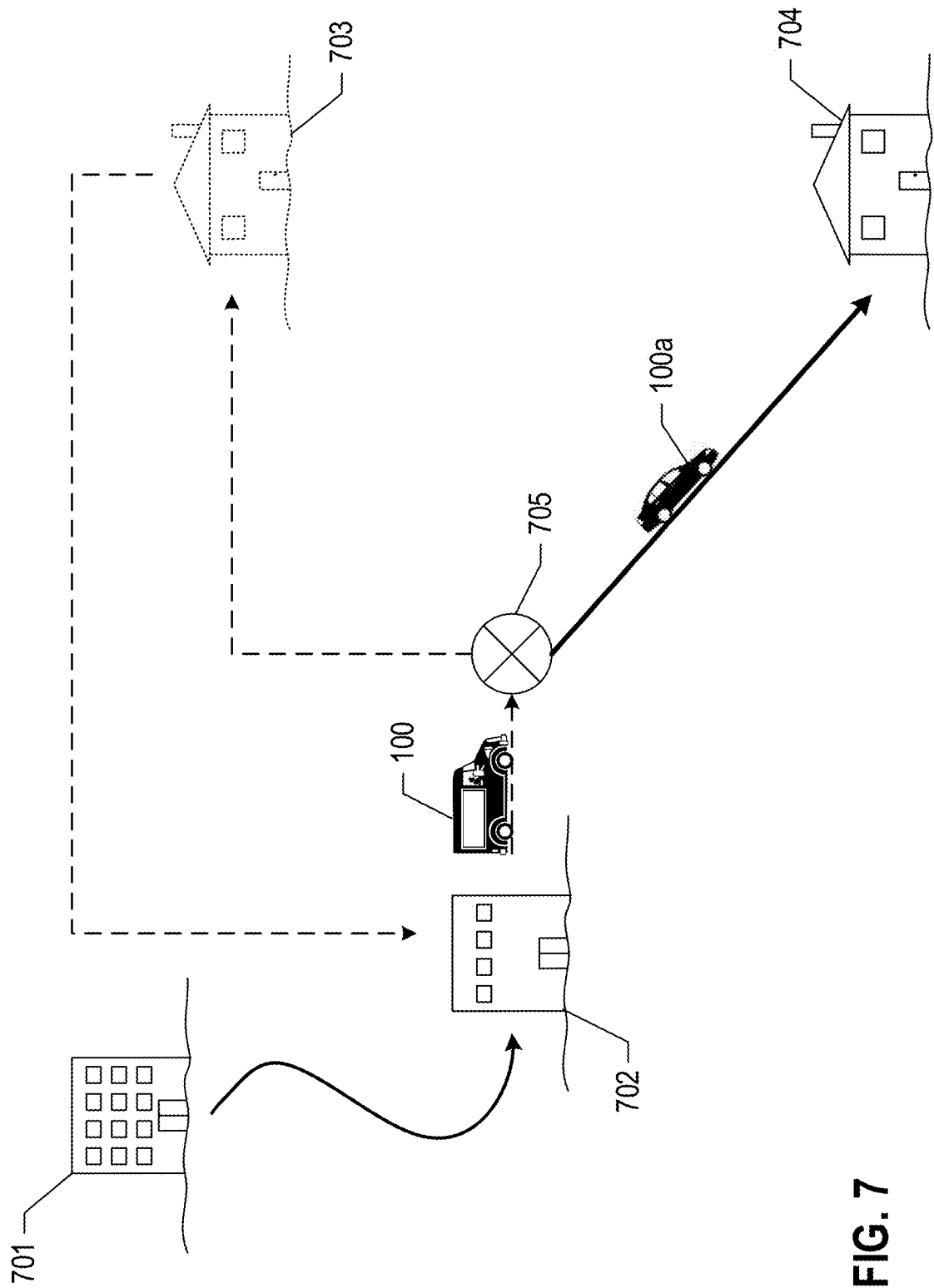
FIG. 7 is a shipment/item flow diagram showing movement of a shipment/item according to various embodiments of the present invention.

Reference will now be made to FIGS. 5-7. FIGS. 5-6 are flowcharts illustrating operations and processes that can be used in accordance with various embodiments of the present invention and FIG. 7 is a schematic diagram illustrating movement of a shipment/item between an origin and an alternative intended destination indicated while the shipment/item is in the possession of a carrier and en route to an initial intended destination.

a. Shipment/Item Redirection Generally

With reference initially to FIG. 5, the carrier receives a shipment/item at a shipment/item origin as indicated at Block 501. For example, the carrier may receive the shipment/item by picking up the shipment/item from the shipment/item origin (e.g., a business, a residence, a drop box (e.g., a carrier operated drop box and/or a third-party drop box), and/or the like), by receiving the shipment/item at a carrier facility (e.g., a carrier operated store-front, a sort location, and/or the like), and/or the like. When the shipment/item is initially received, the shipment/item may be destined for a particular initial intended destination. For example, the initial intended destination may be a specific deliverable point (e.g., a street address, a post office box, and/or the like), a particular region identified by a region identifier (e.g., a city identified by a city name, a specific region identified by a zip code, a specific delivery route, and/or the like). For example, in the latter embodiments, the shipment/item may be shipped to a particular region with the intent that the shipment/item is redirected to a deliverable address while the shipment/item is en route to the particular region and/or after the shipment/item has arrived at a carrier facility associated with the particular region. As a specific example, one or more shipments/items may be shipped to a particular region as discussed in co-pending U.S. patent application Ser. No. 14/859,766, filed on Sep. 21, 2015, the entirety of which is incorporated herein by reference in its entirety.

Upon receipt of the shipment/item at the origin, the carrier may begin transporting the shipment/item to the initial intended destination, as indicated at Block 502. In various embodiments, a central computing entity 110 may receive shipping information/data corresponding to the shipment/item and may store the shipping information/data in one or more memory storage areas (e.g., databases) as PLD information/data for the shipment/item. For example, the PLD information/data may comprise information/data identifying the shipment/item origin, the shipper, the intended recipient, the initial intended destination, a service level (e.g., Ground, Next Day Air, 2-Day Air, and/or the like). Moreover, in various embodiments, the central computing entity 110 may generate additional information/data to be stored as PLD information/data for the shipment/item. For example, the central computing entity 110 may generate a shipment identifier (e.g., a tracking number), one or more sort instructions/routing instructions, and/or the like. Moreover, in various embodiments, the PLD information/data may comprise tracking information/data for the shipment/item (e.g., dynamic tracking information/data). In various embodiments, the tracking information/data may be updated each time additional tracking information becomes available for the shipment/item (e.g., each time the shipment/item is scanned at a sort location) and/or the tracking information/data may be continuously updated to reflect a precise location of the shipment/item (e.g., GPS coordinates, current street address of the shipment/item, and/or the like).

Moreover, transporting the shipment/item from the origin to the initial intended destination may comprise transporting the shipment/item to and/or between one or more intermediate sort locations (e.g., carrier sort locations) between the origin and the initial intended destination, and/or transporting the shipment/item to a final sort location where the shipment/item is loaded onto a last mile delivery vehicle for final delivery to the initial intended destination location.

With reference again to FIG. 5, the central computing entity 110 may be configured to determine whether a request to redirect the shipment/item from the initial intended destination to an alternative intended destination (and/or other service requests to perform location-specific services for a shipment/item) is received as indicated at Block 503. The central computing entity 110 may be configured to receive such requests as "push" requests that cause the central computing entity 110 to perform one or more tasks as discussed herein, and/or the central computing entity 110 may periodically and/or continuously check to determine whether any requests have been received (e.g., "pull" requests). If no shipment redirection requests are received, the shipment/item proceeds along a carrier defined (e.g., central computing entity 110 defined) route to be delivered to the initial intended destination, as indicated at Block 506.

In various embodiments, the shipment redirection requests may be received from one or more user computing entities (e.g., operated by an intended shipment/item recipient and/or a shipper). The shipment redirection requests may be transmitted to the central computing entity 110, for example, via one or more networks (e.g., wired and/or wireless networks), such as the Internet. In various embodiments, the shipment redirection requests may be received via a carrier portal accessible by the one or more user computing entities (e.g., a website accessible via a web browser on the one or more user computing entities, a portal accessible via one or more dedicated computer programs (e.g., applications) operating on one or more user computing entities, and/or the like). In various embodiments, a shipment redirection request may identify one or more shipments/items for redirection (e.g., by indicating corresponding shipment/item identifiers), an alternative intended destination for the shipments/items (e.g., a deliverable point identified by an address, a post office box, and/or the like), and/or the like. In various embodiments, the shipment redirection request may additionally identify a requested delivery date and/or time for the shipments/items at the one or more alternative intended destinations, and/or the like.

If a shipment redirect request (and/or another location-specific service request) is received by the central computing entity 110, the central computing entity 110 may proceed to determine how to effect the requested shipment/item redirect to ensure the shipment/item is delivered to the alternative destination location. As indicated at Block 504, the central computing entity 110 may be configured to determine the current status of the shipment/item and/or the location of the shipment/item along the logistics route between the shipment origin and the shipment initial intended destination. For example, the central computing entity 110 may query the one or more memory storage areas storing PLD information/data corresponding to a plurality of shipments/items to determine the current status of the shipment/item. As a specific example, the central computing entity 110 may be configured to query the tracking information/data for the shipment/item stored within the PLD information/data for the shipment/item to determine the current status and/or location of the shipment/item. In various embodiments, the central computing entity 110 may be configured to recognize various information/data types (e.g., word strings, information/data identifiers, and/or the like) to determine the current status and/or location of the shipment/item. For example, the central computing entity 110 may be configured to recognize tracking information/data of "OUT FOR DELIVERY" as indicating that the shipment/item is already loaded onto a last mile delivery vehicle that is traversing an assigned delivery route to deliver the shipment/item to the initial intended destination. As yet another example, the central computing entity 110 may be configured to recognize specific location identifiers within the tracking information/data as specific sort locations (e.g., the central computing entity 110 may recognize "ATLANTA, GA" as indicating that the shipment/item is at a sort location in Atlanta, Ga., but the shipment/item is not yet on a vehicle for delivery to the initial intended destination location).

In various embodiments, the central computing entity 110 may be configured to determine that additional information is needed to make an informed decision regarding the current status and/or location of the shipment/item after querying the tracking information/data for the shipment/item. Accordingly, the central computing entity 110 may be configured to query one or more additional databases and/or other information/data sources to determine the current location and/or status of a particular shipment/item. For example, the central computing entity 110 may be configured to obtain more detailed information/data regarding the current status of a particular shipment/item if the tracking information/data does not provide sufficient detail to determine an appropriate methodology for redirecting a shipment/item (and/or performing another location-specific service for the shipment/item). For example, upon determining that a shipment/item is on a last mile delivery vehicle traversing an assigned delivery route, the central computing entity 110 may query one or more additional databases to determine the identity of the delivery vehicle containing the shipment/item and/or to determine the current location of the delivery vehicle along the assigned route. For example, the central computing entity 110 may retrieve precise location information/data for the shipment/item (e.g., GPS coordinates) and/or route progress information/data identifying scheduled stops made by the delivery vehicle (e.g., shipment/item delivery and/or pick-up stops) to determine where the delivery vehicle is located along the assigned route. As a specific example that will be discussed herein, the central computing entity 110 may be configured to determine whether the delivery vehicle has already passed a requested alternative intended destination (along the assigned delivery route) but has not yet reached the initial intended destination in instances in which the initial and alternative intended destinations are along the same delivery route.

With reference again to FIG. 5, upon determining that the redirect request is received before the corresponding shipments/items are placed onto a last mile delivery vehicle for delivery to the initial intended destination (as indicated at Block 504), the central computing entity 110 may redirect the shipment/item to the appropriate sort location and/or last mile delivery vehicle to effect delivery to the alternative intended destination, as indicated at Block 507. For example, the central computing entity 110 may update the PLD information/data corresponding to the shipment/item to reflect the alternative intended destination. The central computing entity 110 may additionally generate an electronic flag to be associated with the PLD information/data for the shipment/item to inform appropriate personnel that the intended destination for the shipment/item has changed. Moreover, in various embodiments, the generated flag may cause one or more computing entities to print a new and/or replacement delivery label to be placed onto the shipment/item when the one or more computing entities received PLD information/data corresponding to the shipment/item. For example, when a particular computing entity operated by carrier sort personnel scans an existing shipment label on the shipment/item, the central computing entity 110 may transmit the updated PLD information/data and the corresponding flag to the particular computing entity, which may cause the particular computing entity (or an associated computing entity) to print a replacement shipping label for the shipment/item to indicate that the shipment/item is to be delivered to the alternative intended destination. The carrier may thereafter transport the shipment/item to the appropriate last mile delivery vehicle to effect final delivery to the alternative intended destination.

In instances in which the alternative intended destination and the initial intended destination are located along a common delivery route serviced by a common delivery vehicle, the shipment/item may be placed onto the last mile delivery vehicle and ultimately delivered to the alternative intended destination. In instances in which the alternative intended destination is serviced by last mile delivery vehicles originating from a final sort location shared with a last mile delivery vehicle servicing the initial intended destination, the carrier may direct the shipment/item to the appropriate last mile delivery vehicle within the shared sort location to effect delivery to the alternative intended destination. In instances in which the alternative intended destination is serviced by a last mile delivery vehicle that operates from a different sort facility than the last mile delivery vehicle that services the initial intended destination, the carrier may transport the shipment/item to the appropriate sort location and ultimately to the appropriate last mile delivery vehicle to effect delivery to the alternative intended destination.

Referring again to FIG. 5, upon determining that the shipment/item has already been placed onto the last mile delivery vehicle for delivery to the initial intended destination when the redirection request is received, the central computing entity 110 may perform one or more processes as indicated in FIG. 6 and discussed herein (as shown at Block 505 of FIG. 5).

b. Shipment/Item Redirection after Loading onto a Last Mile Delivery Vehicle

With reference now to FIGS. 5 and 6, various embodiments provide systems and methods for redirecting shipments/items to alternative destination locations (or otherwise enabling location-specific services to be performed for a shipment/item) after the shipments/items are on a last mile delivery vehicle for final delivery to an initial intended destination location.

As discussed above and as illustrated in FIG. 6, a carrier transports a shipment/item from an origin location 701, through the carrier's transportation network, and to a final sort location 702 where the shipment/item is placed on a last mile delivery vehicle 100 for delivery. As discussed herein, the shipment/item is originally placed onto the last mile delivery vehicle 100 scheduled to traverse an assigned delivery route (illustrated schematically as the dashed arrows) and ultimately to deliver the shipment/item to the initial intended destination 703, as indicated at Block 601 of FIG. 6.

As discussed herein, the central computing entity 110 may receive a request to redirect the shipment/item to an alternative intended destination 704 after the shipment/item is already loaded onto the last mile delivery vehicle assigned to deliver shipment/item to the initial intended destination 703, as shown in Blocks 503-505 of FIG. 5 and Block 602 of FIG. 6.

In various embodiments, upon receipt of a request to redirect a shipment/item that is already on a last mile delivery vehicle for final delivery to an initial intended destination 703, the central computing entity 110 may be configured to determine whether the received request satisfies applicable criteria to enable redirection of the shipment/item and, if redirection is possible, to determine an appropriate methodology for redirecting the shipment/item to the alternative intended destination 704.

1. Determining Whether Redirection Request Satisfies Applicable Criteria

In various embodiments, the central computing entity 110 may be configured to determine whether redirection of the shipment/item (and/or other requested location specific services) is available based at least in part on the request to redirect the shipment/item. In various embodiments, the central computing entity 110 may be configured to determine that redirection of a shipment/item may be available when the request to redirect the shipment item satisfies one or more time-based criteria. For example, redirection may only be available if the request to redirect the shipment/item is received before a predefined time on the date of expected delivery of the shipment/item to the initial intended destination 703 (e.g., 2:00 PM), if the request to redirect the shipment/item is received more than a predefined time period prior to estimated delivery of the shipment/item to the initial intended destination 703 (e.g., 30 minutes before the estimated delivery time), and/or the like.

Moreover, in various embodiments, the central computing entity 110 may be configured to determine that redirection of a shipment/item (or other location-specific services) may be available when the service request to redirect the shipment/item satisfies one or more location-based criteria. For example, redirection may only be available if the request to redirect the shipment/item identifies an alternative intended delivery location 704 that is within a threshold distance from the initial intended destination 703, is outside of a threshold distance from the initial destination 703, is within a defined geographical area (e.g., encompassing the initial intended destination 703), and/or the like.

In certain embodiments, applicable location-based criteria may be identified based at least in part on a determination that the request to redirect the shipment/item satisfies one or more of a plurality of time-based criteria. For example, requests to redirect a shipment/item that satisfy a first time-based criteria may be subject to a first location-based criteria, and requests to redirect a shipment/item that do not satisfy the first time-based criteria may be subject to a second location-based criteria.

In certain embodiments, a central computing entity 110 may be configured to determine whether one or more shipments/items are eligible for shipment redirection and/or other location-based services. For example, the PLD information/data corresponding to various shipments/items may comprise information/data indicating whether the shipment/item is eligible for shipment redirection. In various embodiments, a shipper and/or intended recipient may be configured to provide information/data to the central computing entity 110 (e.g., from one or more user computing entities) indicating whether various shipments/items are eligible for shipment redirection. In yet other embodiments, the central computing entity 110 may be configured to determine whether the shipment/item satisfies one or more shipment/item-based criteria to establish eligibility for shipment redirection. For example, shipments/items containing various item types (e.g., predetermined item types, such as chemicals, explosives, firearms, alcohol, tobacco, drugs, and/or the like) may be ineligible for shipment redirection, and accordingly the central computing entity 110 may be configured to update the PLD information/data corresponding to such shipments/items to indicate that the shipments/items are not eligible for shipment redirection.

In certain embodiments, upon determining that the request to redirect the shipment/item is possible (e.g., based on a determination that the request to redirect the shipment/item satisfies applicable criteria), the central computing entity 110 may be configured to determine an appropriate methodology for effecting the requested redirection (and/or other location-specific service) (e.g., based on the current location of the delivery vehicle as determined based on received location information/data and/or the current time). For example, the central computing entity 110 may be configured to determine whether the last mile delivery vehicle 100 containing the shipment/item is able to deliver the shipment/item to the alternative intended destination 704 without a significant deviation from the assigned delivery route, whether another delivery vehicle 100 (e.g., a service provider) may effect delivery to the alternative intended destination 704 within a predefined period of time, whether the shipment/item should be redirected back to the sort location associated with the delivery vehicle 100 and transported to a second sort location to effect delivery to the alternative intended destination, and/or the like.

As shown at Block 603 of FIG. 6, the central computing entity 110 may be configured to determine whether delivery to the alternative intended destination 704 may be effected by the last mile delivery vehicle 100 traversing the assigned delivery route without a substantial deviation from the assigned delivery route. In various embodiments, a determination of whether the last mile delivery vehicle 100 may effect delivery to the alternative intended destination 704 may be impacted by the current location of the delivery vehicle 100 along the assigned delivery route and the location of the remaining (e.g., untraversed) portion of the assigned delivery route relative to the location of the alternative intended destination 704. For example, the central computing entity 110 may be configured to determine that the delivery vehicle 100 containing the shipment/item is eligible to effect delivery of the shipment/item to the alternative intended destination 704 upon a determination that the delivery vehicle 100 may visit the alternative intended destination 704 (e.g., in addition to or in lieu of visiting the initial intended destination 703) without significantly modifying the assigned delivery route for the vehicle 100. The central computing entity 110 may be configured to determine that the delivery vehicle 100 may visit the alternative intended destination 704 without significantly modifying the assigned delivery route for the vehicle 100 upon determining that a modified version of the remaining (e.g., untraversed) portion of the delivery route that incorporates a stop at the alternative intended destination 704 satisfies applicable criteria stored within the central computing entity 110. For example, the central computing entity 110 may be configured to determine that the modified version of the remaining portion of the delivery route satisfies applicable criteria upon a determination that the length of the modified version of the remaining portion of the delivery route is within a predefined length of the length of the unmodified (e.g., original) version of the remaining portion of the delivery route. As a specific example, the central computing entity 110 may be configured to determine that a modified version of the remaining portion of the delivery route is not significantly different from the unmodified portion of the delivery route upon a determination that the modified version of the remaining portion of the delivery route is less than 5 miles greater than the unmodified version of the remaining portion of the delivery route. As yet other non-limiting embodiments, the predefined criteria for determining whether the modified version of the remaining portion of the delivery route is significantly different than the unmodified version of the remaining portion of the delivery route may be based on an estimated time difference between the modified and unmodified versions of the remaining portion of the delivery route (e.g., within a 15 minute difference), based on an estimated amount of fuel to be utilized (e.g., within ⅛ of a gallon of estimated fuel usage difference between the modified and unmodified versions of the remaining portion of the delivery route), and/or the like.

As indicated at Block 612 of FIG. 6, upon determining that the last mile delivery vehicle 100 can effect delivery of the shipment/item to the alternative intended destination 704, the central computing entity 110 may be configured to facilitate delivery of the shipment/item to the alternative intended destination 704 by the last mile delivery vehicle 100. In various embodiments, the central computing entity 110 may be configured to generate one or more flags within the PLD information/data for the shipment/item to indicate that the shipment/item is redirected to the alternative destination location 704, to update the assigned delivery route for the last mile delivery vehicle 100, to transmit a notification to the vehicle 100 and/or a mobile computing entity 105 associated with a vehicle operator, and/or the like.

With reference again to FIG. 6, upon determining that the alternative intended destination 704 is not along the remaining portion of the delivery route assigned to the last mile delivery vehicle 100, the central computing entity 110 may be configured to determine whether the shipment/item may be delivered to the alternative destination location 704 within a predefined time period and/or whether the alternative intended destination is within a predefined geographic area (e.g., within a predefined distance from the initial intended destination 703, within a predefined distance from the delivery route, and/or the like), such that a service provider 100*a* may deliver the shipment/item from the last mile delivery vehicle 100 to the alternative intended destination 704, as indicated at Block 604.

In various embodiments, the central computing entity 110 may be configured to determine whether the shipment/item is eligible for delivery to the alternative intended destination 704 via a service provider 100*a* based on one or more criteria, such as one or more time-based criteria and/or one or more location-based criteria. For example, the central computing entity 110 may be configured to determine whether delivery may be made from the last mile delivery vehicle 100 to the alternative intended destination 704 within a predefined amount of time (e.g., 2 hours), prior to a predefined deadline (e.g., 7 PM), and/or the like. Accordingly, upon determining that delivery to the alternative intended destination 704 may not be effected by the last mile delivery vehicle 100 as discussed herein, the central computing entity 110 may be configured to determine an estimated time to effect delivery of the shipment/item to the alternative intended destination 704 and/or an estimated delivery time for the shipment/item at the alternative intended destination 704 if delivered by a service provider 100*a*. In various embodiments, the central computing entity 110 may be configured to query one or more databases and/or external information/data sources (e.g., third party databases) to determine an estimated delivery time for the shipment/item by a service provider 100*a*. For example, the central computing entity 110 may be configured to query a map database, a traffic database, a third party vehicle provider database, and/or the like to determine whether delivery may be made according to the one or more of the time-based criteria.

In various embodiments, the central computing entity 110 may be configured to determine whether the alternative intended destination 704 satisfies one or more location-based criteria. For example, the central computing entity 110 may be configured to compare the location of the alternative intended destination 704 against the location of the initial intended destination 703, the location of the assigned delivery route for the last mile delivery vehicle 100 carrying the shipment/item, the location of a predefined geographical area, and/or the like. In various embodiments, the central computing entity 110 may be configured to determine that the shipment/item is eligible for delivery via a service provider 100*a* to the identified alternative intended destination 703 upon a determination that the alternative intended destination 704 satisfies the location-based criteria. As non-limiting examples, the central computing entity 110 may be configured to determine that the alternative intended destination 704 satisfies the location-based criteria upon a determination that the alternative intended destination 704 is within a predefined distance of the initial intended destination 703, upon a determination that the alternative intended destination is within a predefined distance of the assigned delivery route (e.g., the alternative intended destination is within a predefined distance of the closest point of the assigned delivery route), upon a determination that the alternative intended destination 704 is within a predefined geographical area (e.g., the same city as the initial intended destination 703, the same postal area (e.g., zip code) as the initial intended destination, the same county as the initial intended destination, and/or the like), and/or the like.

In various embodiments, various shipments/items may be identified as ineligible for delivery via a service provider 100*a* based on one or more shipment/item-based criteria. For example, a shipper and/or intended recipient may provide information/data to the central computing entity 110 (e.g., via one or more user computing entities) indicating that one or more shipments/items are ineligible for delivery via a service provider 100*a*. In other embodiments, the central computing entity 110 may compare the PLD information/data corresponding to a particular shipment/item against one or more criteria to determine whether the shipment/item is eligible for delivery via a service provider 100*a*. For example, shipments/items containing certain item types (e.g., chemicals, explosives, firearms, drugs, and/or the like) may be identified as ineligible for delivery via a service provider 100*a*. As yet other examples, the central computing entity 110 may be configured to determine whether the size and/or weight of the shipment/item satisfies applicable criteria to enable delivery via a service provider 100*a*. For example, the central computing entity 110 may be configured to compare the PLD information/data of the shipment/item against a maximum weight and/or maximum size threshold to determine whether the shipment/item is eligible for delivery via a service provider 100*a*. In embodiments in which the central computing entity 110 determines that delivery via a service provider 100*a* is unavailable for a particular shipment/item, the central computing entity 110 may be configured to reroute the shipment/item back to the sort location such that the shipment/item may be placed onto an appropriate last mile delivery vehicle 100 for delivery to the alternative intended destination 704 upon receipt of a request to redirect the shipment/item to the alternative intended destination.

With reference to Block 613 of FIG. 6, upon a determination that the alternative intended destination 704 does not satisfy the one or more criteria for delivery of the shipment/item to the alternative intended destination 704 via a service provider 100*a*, the central computing entity 110 may be configured to facilitate redirection of the shipment/item to an appropriate last mile delivery vehicle 100 to effect delivery to the alternative intended destination 704. Accordingly, the central computing entity 110 may update the PLD information/data corresponding to the shipment/item to indicate the alternative indicated destination 704, to generate a notification to be transmitted to the delivery vehicle 100 and/or a mobile device associated with the vehicle operator to refrain from delivering the shipment/item at the initial intended destination 703 and to return the shipment/item to the sort location such that the shipment/item may be rerouted to the appropriate sort location and/or delivery vehicle 100 to effect delivery to the alternative intended destination.

Upon determining that the shipment/item may be delivered to the alternative intended destination 704 via a service provider 100*a*, the central computing entity 110 may be configured to arrange delivery via a service provider 100*a*, as discussed herein.

2. Arranging Delivery Via a Service Provider

In various embodiments, the service provider 100*a* may be a second delivery vehicle (e.g., owned and/or operated by the carrier), a third party vehicle (e.g., a privately owned vehicle owned and/or operated by an individual; a vehicle owned and operated by a third party service provider, and/or the like), and/or the like. In various embodiments, the service provider 100*a* may be one of a plurality of service providers operating and/or managed by a peer-based entity (e.g., Uber, UberEats, Lyft, GetMe, and/or the like) configured to manage, arrange, and/or otherwise distribute tasks among a plurality of individuals via electronic communication with mobile devices associated with each of the plurality of individuals. In various embodiments, the peer-based entity may be configured to arrange rides for individuals in one more peer-based service providers 100*a*, shipping services (e.g., shipment/item deliveries), local courier services (e.g., food delivery and/or pick-up), and/or the like. In various embodiments, the central computing entity 110 may be configured to select an appropriate service provider 100*a* from a plurality of service providers 100*a*.

Upon determining that a shipment/item is eligible for delivery to the alternative intended destination 704 (and/or another requested location-specific service) via a service provider 100a (as indicated at Block 604), the central computing entity 110 may be configured to identify one or more service providers 100a available for delivery of the shipment/item. In various embodiments, each of a plurality of service providers 100a may have a corresponding service provider profile (e.g., stored within the central computing entity 110 and/or a third party computing entity). The service provider profile may comprise information/data indicative of a vehicle type (e.g., sedan, coupe, SUV, crossover, open-bed truck, closed cargo truck, cargo van, minivan, and/or the like), a volume of cargo space available for placement of a shipment/item within the vehicle (e.g., identified as a maximum shipment/item size and/or a cargo area volume), a maximum shipment/item weight that may be transported by the vehicle, one or more licenses associated with an operator of the service provider 100a (e.g., hazardous material transport license, commercial vehicle license, and/or the like), and/or the like. Upon determining that the shipment/item may be delivered by a service provider 100a, the central computing entity 110 may be configured to compare the PLD information/data corresponding to the shipment/item against one or more service provider profiles to identify one or more service providers 100a capable of transporting the shipment/item. For example, the central computing entity 110 may be configured to compare known dimensions of the shipment/item against known cargo dimensions of vehicles as stored in the service provider profiles 100a. Moreover, the central computing entity 110 may be configured to identify one or more service providers 100a that are working (on-duty, available, and/or other words used herein interchangeably) such that only those vehicles that are operating and offering transportation services may be considered. The central computing entity 110 may thus filter the plurality of service providers 100a such that the central computing entity 110 only considers service providers 100a that satisfy one or more applicable criteria as being eligible to transport the shipment/item to the alternative destination when searching for an eligible service provider 100a.

In certain embodiments, the central computing entity 110 may be configured to identify one or more service providers 100a satisfying one or more location-based criteria. For example, the central computing entity 110 may be configured to receive service provider location information/data from each of a plurality of service providers 100a (e.g., available service providers 100a) indicative of a current location of each of the service providers 100a. As discussed herein, the service provider location data may be generated by a location determining aspect in association with a service provider computing entity carried by the service provider 100a. The central computing entity 110 may be configured to compare the service provider location information/data against location-based criteria, such as a maximum distance away from the delivery route, a predefined area (e.g., a geofenced area) within which the service provider 100a should be located, and/or the like, to determine whether the service provider 100a is eligible to deliver the shipment/item to the alternative destination location. In various embodiments, the central computing entity 110 may be configured to filter the one or more service providers 100a such that only those service providers 100a satisfying the location-based criteria are considered for delivering the shipment/item to the alternative destination location.

Upon filtering the one or more service providers 100a (e.g., based on time-based criteria, shipment/item based criteria, location-based criteria, and/or the like), the central computing entity 110 may be configured to apply one or more selection criteria to select a single service provider 100a to effect delivery of the shipment/item to the alternative intended destination. For example, the central computing entity 110 may be configured to select the closest service provider 100a to the last mile delivery vehicle 100 (e.g., based on location information/data associated with the delivery vehicle 100 and/or the service provider 100a), the service provider 100a offering the lowest cost to deliver the shipment/item to the alternative intended destination, the service provider 100a satisfying shipper and/or intended recipient preferences, the service provider 100a having the highest customer ranking, and/or the like. As a specific example, the central computing entity 110 may be configured to receive (e.g., in real time) service provider location information/data from each of a plurality of service providers 100a. The central computing entity 110 may be configured to compare the current location of each service provider 100a (e.g., as determined by most recent service provider location information/data for each of the plurality of service providers 100a) against route information/data and/or delivery vehicle location information/data for the delivery vehicle 100 (e.g., as determined by most recent location information/data received from the delivery vehicle 100) to identify a service provider 100a closest to the delivery vehicle 100 and/or the delivery route assigned to the delivery vehicle 100.

As another example, the central computing entity 110 may be configured to identify one or more service providers 100a that may meet the delivery vehicle 100 at one or more potential handoff locations along the delivery route (e.g., at an estimated time that the delivery vehicle 100 would arrive at each of the potential handoff locations as the delivery vehicle 100 traverses the assigned route). Accordingly, a plurality of service providers 100a may be determined eligible for transporting the shipment/item to the alternative intended destination upon determining that a plurality of service providers 100a may be capable of meeting the delivery vehicle 100 at one or more handoff locations. In such embodiments, one or more additional criteria (e.g., cost, time-based criteria, random selection, and/or the like) may be utilized to select one of the service providers 100a to transport the shipment/item.

In certain embodiments, the central computing entity 110 may be configured to select a service provider 100a based on a plurality of criteria. For example, the central computing entity 110 may be configured to assign a weight to each considered criteria and to generate an overall score based at least in part on the determined weighted criteria. The central computing entity 110 may be configured to select the service provider 100a having the highest (or lowest) weighted score. As just one non-limiting example, the central computing entity 110 may be configured to consider a plurality of: the distance between the service provider 100a and the delivery vehicle 100, the rating of the service provider 100, the cost (e.g., estimated cost) to deliver the shipment/item to the alternative intended destination by the service provider 100a, and/or the like when selecting a particular service provider 100a to deliver the shipment/item to the alternative intended destination. In certain embodiments, the central computing entity 110 may be configured to generate a ranked list of possible service providers 100a that are determined to be eligible for transporting the shipment/item to the alternative intended destination. In such embodiments, the central computing entity 110 may be configured to select the highest ranked available service provider 100a to transport the shipment/item to the alternative intended destination.

Although discussed herein as the central computing entity 110 selecting a particular service provider 100a to effect delivery of the shipment/item to the alternative intended destination, it should be understood that, in various embodiments, the central computing entity 110 may be configured to query a third party computing entity (e.g., a peer-based service provider management system) to select a service provider 100a. For example, the central computing entity 110 may be configured to transmit a request to reserve and/or engage a service provider 100a to the third party computing entity, which then selects and provides a service provider 100a to transport the shipment/item to the alternative intended destination 704. As discussed herein, the request may identify the alternative intended destination 704 and may identify one or more potential handoff locations where the service provider 100a can meet the last mile delivery vehicle 100 to obtain the package and/or one or more potential handoff times. Upon receipt of the request, the third party computing entity may select a service provider 100a, a handoff location 705, and/or a handoff time to effect transportation of the shipment/item from the last mile delivery vehicle 100 to the alternative intended destination.

With reference again to FIG. 6, the central computing entity 110 may identify a handoff location 705 and/or time at which the service provider 100a meets the last mile delivery vehicle 100 to effect a handoff of the shipment/item from the last mile delivery vehicle 100 to the service provider 100a, as shown at Block 606. Although illustrated in separate representative Blocks in FIG. 6, the steps for identifying a service provider 100a and for identifying a handoff time and location 705 may occur simultaneously. In various embodiments, the selection of a particular service provider 100a may impact a selection of a handoff time and/or handoff location 705, and/or vice versa. For example, a first service provider 100a may be proximate a first potential handoff location 705 at a first time, and a second service provider 100a may be proximate a second potential handoff location at a second time. Upon selecting the second service provider 100a to effect transportation of the shipment/item, the central computing entity 110 may determine that the shipment/item handoff should occur at the second handoff time and location.

In various embodiments, the one or more potential handoff locations may be particular locations along the assigned route of the last mile delivery vehicle 100. In certain embodiments, the one or more potential handoff locations may be preassigned stops (e.g., delivery stops and/or pickup stops for other shipments/items) where a service provider 100a could meet the last mile delivery vehicle 100 to effect the transfer of the shipment/item from the delivery vehicle 100 to the service provider 100a. In yet other embodiments, the one or more potential handoff locations may be identified as potential locations where the last mile delivery vehicle 100 could park and which would not require a significant deviation from the preassigned delivery route of the vehicle 100 (identified in accordance with the discussion regarding significant deviations from the delivery route provided above). The one or more potential handoff times may be identified based at least in part on the one or more potential handoff locations. The one or more potential handoff times may be identified as the estimated times at which the last mile delivery vehicle 100 is expected to reach the one or more potential handoff locations. Accordingly, in certain embodiments, each potential handoff location may have a corresponding potential handoff time. In various embodiments, identifying a handoff location 705 may comprise comparing route information/data indicative of the assigned route for the delivery vehicle 100 against delivery vehicle location information/data indicative of a current location of the delivery vehicle along the assigned route, in order to identify an untraversed portion of the assigned route. Upon identifying the untraversed portion of the assigned route, the central computing entity 110 may be configured to identify one or more potential handoff locations (and corresponding potential handoff times) along the assigned route. For example, a plurality of potential handoff locations may be stored in association with the central computing entity 110, such that the central computing entity 110 may be configured to select one or more of the potential handoff locations located along the assigned route, and to determine an estimated time at which the delivery vehicle will arrive at the selected one or more potential handoff locations in order to identify corresponding handoff times. As yet another non-limiting example, the central computing entity 110 may be configured to monitor the untraversed portion of the assigned route, and to identify one or more potential handoff locations that satisfy stored handoff location criteria. For example, the handoff location criteria may identify parking areas within a predefined distance of the untraversed portion of the assigned route, preassigned vehicle stops, and/or the like as potential handoff locations.

As noted above, the central computing entity 110 may be configured to identify a service provider 100a, a handoff location 705, and/or a handoff time to enable the service provider 100a to deliver the shipment/item at the alternative intended destination 704. However, it should be understood that the central computing entity 110 may be configured to transmit a request for a service provider 100a to a third party computing entity (e.g., a peer based vehicle and/or service provider provider) to select a service provider 100a based at least in part on characteristics of the shipment/item, the location of the alternative intended destination, the location of one or more potential handoff locations and times, and/or the like. In such embodiments, the third party computing entity may transmit information/data identifying the selected service provider 100a to the central computing entity 110.

3. Delivery from the Last Mile Delivery Vehicle to the Alternative Intended Destination Upon selecting a service provider 100a, a handoff time, and a handoff location 705, the last mile delivery vehicle 100 and the service provider 100a (and their respective operators) may meet at the handoff location 705 at the handoff time to transfer the shipment/item from the delivery vehicle 100 to the service provider 100a. As indicated at Block 607, in various embodiments, the carrier (and/or the central computing entity 110) may request verification of the identity of the service provider 100a (and the associated service provider operator) prior to transferring possession of the shipment/item to the service provider 100a. In various embodiments, the central computing entity 110 may transmit identity verification information/data identifying the service provider 100a to the last mile delivery vehicle 100 and/or a mobile computing entity 105 associated with the vehicle operator. In various embodiments, the identity verification information/data may comprise a vehicle identifier, a name of the service provider, a photo of the service provider and/or the service provider vehicle, and/or the like. In certain embodiments, verification of the identity of the service provider 100a may comprise visual verification of the identity of the service provider 100a by the last mile delivery vehicle operator. In such embodiments, the delivery vehicle operator may provide user input to the mobile device 105 and/or the delivery vehicle 100 indicating that the delivery vehicle operator verified the identity of the service provider 100*a*.

In various embodiments, the identity verification process may utilize electronic identity verification procedures to verify the identity of the service provider at the handoff location. For example, the central computing entity 110 may transmit (e.g., directly and/or via one or more third party computing entities) a verification code (e.g., a barcode, a QR code, a Maxicode, an alphanumeric string, a symbol, and/or the like) to one or more of the delivery vehicle 100, a mobile device 105 associated with the delivery vehicle operator, and/or a mobile device 105 associated with the service provider. To verify the identity of the service provider 100*a*, the verification code may be input (e.g., via user input, via scanning, via NFC data transmission, via Bluetooth data transmission, and/or the like) into another of the delivery vehicle 100, a mobile device 105 associated with the delivery vehicle operator, and/or a mobile device 105 associated with the service provider, and the verification code may be transmitted (e.g., directly and/or via one or more third party computing entities) to the central computing entity 110. Upon receipt, the central computing entity 110 may compare the verification code and information/data identifying the source of the transmitted verification code against stored information/data identifying an expected verification code and an expected source of the verification code to verify the identity of the service provider 100*a*. Upon identifying a match between the received verification code and source of the verification code and the expected verification code and expected source of the verification code, the central computing entity 110 may verify the identity of the service provider 100*a*. In various embodiments, the central computing entity 110 may be configured to transmit (e.g., directly and/or via one or more third party computing entities) a notification to one or more of the delivery vehicle 100, a mobile device 105 associated with the delivery vehicle operator, and/or a mobile device 105 associated with the service provider to inform the delivery vehicle operator and/or the service provider that the identity of the service provider has been verified.

As yet another example, two or more of the delivery vehicle 100, the mobile device 105 associated with the delivery vehicle operator, and/or the mobile device 105 associated with the service provider may be configured to perform a virtual handshake to verify the identity of the service provider 100*a*. In such embodiments, the central computing entity 110 may be configured to transmit (e.g., directly and/or via one or more third party computing entities) virtual handshake information/data signals to two or more of the delivery vehicle 100, a mobile device 105 associated with the delivery vehicle operator, and/or a mobile device 105 associated with the service provider. While at the handoff location and time, two or more of the delivery vehicle 100, a mobile device 105 associated with the delivery vehicle operator, and/or a mobile device 105 associated with the service provider may perform the virtual handoff, for example, via wireless communications between the two or more of the delivery vehicle 100, a mobile device 105 associated with the delivery vehicle operator, and/or a mobile device 105 associated with the service provider (e.g., NFC communications, Bluetooth communications, and/or the like). Upon performing the virtual handshake, one or more of the delivery vehicle 100, a mobile device 105 associated with the delivery vehicle operator, and/or a mobile device 105 associated with the service provider may transmit a signal to the central computing entity (e.g., directly and/or via a third party computing entity) indicating the virtual handshake has been performed to verify the identity of the service provider 100*a*.

As indicated at Block 608 of FIG. 6, the shipment/item is transferred from the last mile delivery vehicle 100 to the service provider 100*a*. In various embodiments, the transfer may occur after verification of the identity of the service provider 100*a*, however in certain embodiments, the shipment/item may be transferred without verification of the service provider 100*a*. In various embodiments, upon transferring the shipment/item to the service provider 100*a*, one or more of the delivery vehicle 100, a mobile device 105 associated with the delivery vehicle operator, and/or a mobile device 105 associated with the service provider may transmit a signal to the central computing entity 110 indicating that the shipment/item has been transferred to the service provider 100*a*. Upon receipt, the central computing entity 110 may update the PLD information/data to reflect the transfer, and may facilitate tracking of the service provider location as a proxy for the location of the shipment/item as it is carried to the alternative intended destination 704, as indicated at Block 609 of FIG. 6.

As discussed herein, the service provider computing entity may be configured to continuously and/or periodically transmit information/data indicative of the location of the service provider computing entity to the central computing entity 110 while the service provider is transporting the shipment/item. In various embodiments, the central computing entity 110 may update the PLD information/data corresponding to the shipment/item to reflect the updated location of the shipment/item (based on the location of the service provider computing entity).

Moreover, as discussed above, the service provider computing entity may be configured to generate delivery verification information/data to reflect delivery of the shipment/item at the alternative intended destination 704, as indicated at Block 610. For example, the service provider computing entity may be configured to generate image information/data showing the shipment/item at the alternative intended destination, showing at least a portion of the alternative intended destination 704 (e.g., a house number corresponding to the alternative intended destination), a signature of the intended recipient, and/or the like. As yet other embodiments, the service provider computing entity may be configured to accept a delivery verification code (e.g., an alphanumeric code, a barcode, a QR code, a Maxicode, and/or the like) placed at the alternative intended destination, and/or the like. In various embodiments, the delivery verification information/data may comprise identity verification information/data for a shipment/item recipient. In various embodiments, the identity verification information/data for the shipment/item recipient may comprise a signature of the shipment/item recipient (e.g., captured via user input on the service provider computing entity), a photo of the shipment/item recipient, a photo of the shipment/item recipient's ID (e.g., passport, driver's license, and/or the like), and/or the like. In various embodiments, the identity verification information/data for the package recipient may be similar to that described above for verifying the identity of the service provider at the time the shipment/item is handed-over to the service provider. Accordingly, the identity verification process for a shipment/item recipient may comprise electronic identity verification procedures (e.g., receiving identity verification information/data from a central computing entity 110, comparing identity verification data received by a mobile computing entity 105 owned by the shipment/item recipient against identity verification data received by the service provider computing entity, and/or the like).

In various embodiments, the service provider computing entity may be configured to transmit the delivery verification information/data to the central computing entity 110. The central computing entity 110 may be configured to update the PLD information/data corresponding to the delivered shipment/item to include the delivery verification information/data and/or to include information/data indicating that the shipment/item was delivered to the alternative intended destination 704.

Moreover, in various embodiments, the service provider computing entity may be configured to receive payment from the shipment/item recipient for additional costs/fees associated with the delivery redirection. Accordingly, the service provider computing entity may utilize one or more payment processing components (e.g., card readers, NFC readers, and/or the like) to receive payment from the shipment/item recipient at the time of delivery. In such embodiments, the service provider computing entity may be configured to receive information/data from the central computing entity 110 indicative of an amount owed by the shipment/item recipient (e.g., via a computer program enabling communication between the central computing entity 110 and the service provider computing entity). Moreover, the service provider computing entity may be configured to receive payment information/data (e.g., via the payment processing component) to settle the amount owed by the shipment/item recipient. The service provider computing entity may be configured to process the payment locally (e.g., via communications with one or more banking institutions), and/or the service provider computing entity may be configured to transmit payment processing information/data to the central computing entity 110 for processing. In various embodiments, the service provider computing entity may be configured to encrypt at least a portion of the payment information before processing and/or before transmitting the same to the central computing entity 110.

In various embodiments, the central computing entity 110 may facilitate payment of the service provider 100a for completing the delivery upon receipt of the delivery verification information/data. In embodiments in which the service providers 100a are independent contractors, peer-based service providers, and/or the like, the carrier may provide payment to the service providers 100a for completing deliveries of shipments/items to respective alternative destination locations 704. Accordingly, upon receipt of delivery verification information/data, the central computing entity 110 may initiate payment to the service provider 100a, as indicated at Block 611. For example, the central computing entity 110 may transmit a signal to a payment processing entity to transfer funds to the service provider 100a (e.g., a pre-established account associated with the service provider). In certain embodiments, the central computing entity 110 may wait for a predetermined escrow period (e.g., hours, days, weeks, and/or the like) prior to transferring funds to the service provider. For example, the central computing entity 110 may be configured to wait a period of time to enable an intended recipient to complain that a shipment/item was not properly delivered before transferring funds. As yet another example, the central computing entity 110 may be configured to enable funds transfers to service provider accounts periodically (e.g., weekly, bi-weekly, monthly, and/or the like).

c. Shipment/Item Pick-Up Via Service Providers

In various embodiments, service providers may be utilized to perform shipment/item pick-ups from a shipment/item source. For example, the service providers may pick-up shipments/items to be returned to a shipment/item origin (e.g., shipments/items originally shipped to a recipient, and for which the recipient wishes to return the shipment/item to the original shipper). In such embodiments, the service providers may pick-up shipments/items from one or more shipment origins (e.g., shipper residences, shipper businesses, and/or the like) and transport the shipments/items to a delivery vehicle at a determined hand-off location and hand-off time.

The process for receiving a pick-up request, selecting a service provider, and selecting a hand-off location and a hand-off time may be analogous to that discussed herein in reference to processes for receiving a delivery redirection request for a shipment/item already on a delivery vehicle for delivery to an initial intended destination location; selecting a service provider to transport the shipment/item from the delivery vehicle to the alternative intended destination location; and selecting a hand-off location and a hand-off time to complete the transfer from the delivery vehicle to the service provider.

As an example, the central computing entity 110 may receive a pick-up request from a shipment/item shipper (e.g., via a graphical user interface available via a shipper's computing entity). In various embodiments, the pick-up request may comprise shipment/item information/data, such as information/data indicative of the size, weight, content, and/or the like of the shipment/item to be picked-up, the requested pick-up location, and/or the like. Upon receipt of the pick-up request, the central computing entity 110 may be configured to determine whether the shipment/item should be picked up by a delivery vehicle or a service provider that can transport the shipment/item to a delivery vehicle. For example, the central computing entity 110 may be configured to compare the requested pick-up location against the current location of one or more delivery vehicles, to determine whether the pick-up location is along an untraversed portion of a route assigned to one or more delivery vehicles.

Upon determining that the requested pick-up location is along an untraversed portion of a route assigned to a particular delivery vehicle, the central computing entity 110 may assign a pick-up stop to a delivery vehicle corresponding to the pick-up request. The pick-up stop may be incorporated into the route assigned to the delivery vehicle (e.g., by transmitting updated route data to the delivery vehicle and/or a mobile computing entity 105 associated with the delivery vehicle), such that the delivery vehicle is scheduled to stop at the pick-up location along the route.

Upon determining that the requested pick-up location is not along an untraversed portion of a route assigned to a delivery vehicle, and/or upon determining that a delivery vehicle is otherwise unavailable to pick-up the shipment/item, the central computing entity 110 may be configured to request pick-up services from one or more service providers, as discussed herein in reference to requesting delivery services. The central computing entity 110 may utilize one or more algorithms to select an appropriate service provider to complete the pick-up (e.g., based on the current locations of the one or more service providers, the carrying capacity of one or more service providers, a rating associated with one or more service providers, and/or the like).

As discussed herein in reference to features for assigning a delivery task to a particular service provider, the central computing entity 110 may be configured to transmit information/data to the service provider indicative of the location of the pick-up location. The central computing entity 110 may additionally be configured to identity a hand-off location and a hand-off time at which the service provider hands the shipment/item over to a delivery vehicle. For example, as discussed above in reference to selecting a hand-off location and hand-off time for a delivery service, the central computing entity 110 may identity an appropriate hand-off location and hand-off time based on the current location of the service provider, the pick-up location, the estimated amount of time for the service provider to reach the pick-up location and to travel to one or more potential hand-off locations, the current location of the delivery vehicle, and/or the like.

In various embodiments, while identifying a hand-off location and a hand-off time for the shipment/item to be provided to a delivery vehicle, the central computing entity 110 may be configured to identify an appropriate delivery vehicle to receive the shipment/item from the service provider. Accordingly, the central computing entity 110 may be configured to select a delivery vehicle from a plurality of delivery vehicles that is scheduled to arrive at a hand-off location at about the hand-off time. Accordingly, the central computing entity 110 may be configured to identify a plurality of hand-off locations for the service provider, as well as an estimated time at which the service provider is likely to be able to arrive at the potential hand-off locations. Similarly, the central computing entity 110 may be configured to identify a plurality of potential hand-off locations and corresponding arrival times for a plurality of delivery vehicles. The central computing entity 110 may then compare the potential hand-off locations and corresponding arrival times for the service provider with the potential hand-off locations and corresponding arrival times for the plurality of delivery vehicles, and may select a hand-off location and corresponding arrival time that overlaps between the service provider and one of the delivery vehicles. In various embodiments, the central computing entity 110 may comprise one or more criteria for selecting a particular hand-off location and hand-off time when a plurality of hand-off locations and corresponding arrival times overlap between the service provider and one or more delivery vehicles. As just one non-limiting example, the central computing entity 110 may be configured to select the hand-off location and corresponding hand-off time located closest to the pick-up location for the shipment/item.

Upon selecting a service provider, a hand-off location and a hand-off time, the central computing entity 110 may be configured to transmit pick-up instructions to the service provider computing entity, and/or to update the delivery route assigned to the delivery vehicle identified as the receiving delivery vehicle to incorporate the hand-off location as a stop along an untraversed portion of the route.

As discussed herein in reference to the delivery redirection process, the central computing entity 110 may be configured to track the location of the service provider as the service provider completes the pick-up process. In various embodiments, the service provider computing entity may be configured to collect pick-up verification data (e.g., similar to delivery verification data) while at the pick-up location. For example, the pick-up verification data may comprise one or more images collected by the service provider computing entity while at the pick-up location (e.g., images of the shipment/item; images of the pick-up location; images of the shipment/item shipper; images of the shipment/item shipper's ID; and/or the like).

Moreover, in various embodiments, the service provider computing entity may be configured to process a payment from the shipment/item shipper while at the pick-up location. Like the process discussed herein in reference to delivery processes, the service provider computing entity may be configured to receive data from the central computing entity 110 indicative of an amount owed by the shipment/item shipper. The service provider computing entity may then receive payment information/data, such as via a payment processing component, and may enable processing of the payment information/data locally and/or after transfer of the same to the central computing entity 110.

After picking-up the shipment/item from the pick-up location, the service provider may transport the shipment/item to the identified hand-off location by the identified hand-off time. While at the hand-off location, the service provider may provide the shipment/item to the delivery vehicle (e.g., personnel operating the delivery vehicle). Moreover, in certain embodiments, an identity verification process may be performed between the delivery vehicle (and/or a mobile computing entity 105 associated with the delivery vehicle) and the service provider and/or the service provider computing entity. Like the identification verification process described herein when a shipment/item is provided to a service provider for final delivery to an alternative intended destination location, the identity verification process performed when a shipment/item is provided to a delivery vehicle may comprise one or more electronic and/or manual identity verification procedures (e.g., by comparing identity verification data received by the mobile computing entity 105 associated with the delivery vehicle and identity verification data received by the service provider computing entity; by performing a visual comparison between the service provider and a known photo of the service provider; and/or the like).

Moreover, at the hand-off location, the delivery vehicle (and/or personnel associated with the delivery vehicle) may scan the shipment/item to generate information/data indicating that the shipment/item has been received at the delivery vehicle. The generated data may be transmitted to the central computing entity 110 to verify that the shipment/item is successfully transferred to the delivery vehicle. In various embodiments, upon receiving data indicating that the shipment/item is successfully transferred to the delivery vehicle, the central computing entity 110 may be configured to process a payment to the service provider for services rendered in transporting the shipment/item from the pick-up location to the delivery vehicle. As discussed above in reference to payment processing for delivery services, the central computing entity 110 may be configured to process payment to the service provider after a predefined time period, and/or the like.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

In various embodiments, various delivery redirection methodologies may be utilized at various points during a delivery process. Although the foregoing description provides a discussion of various delivery redirection methodologies as being available at corresponding points during a delivery process for a shipment/item, it should be understood that alternative delivery redirection processes may be utilized. For example, if a delivery redirection request is received before a shipment/item is out for delivery on an initial delivery vehicle, the delivery redirection process may utilize a service provider to transport the shipment/item from the initial delivery vehicle to the alternative intended destination location once the shipment/item has been loaded onto the delivery vehicle. As yet another example, a delivery redirection process for a shipment/item already out for delivery on a delivery vehicle may be redirected by returning the shipment/item to a hub, and redirecting the shipment/item onto a second delivery vehicle from the hub, regardless of the relative proximity between the initial intended destination location and the alternative intended destination location.

That which is claimed:

1. A method for engaging a service provider to perform a location-specific service involving an item, the method comprising steps for:
receiving a request to deliver an item located on a vehicle traversing an assigned vehicle route to an alternative destination, wherein an initial destination for the item is on the assigned vehicle route;
in response to determining that an amount of additional fuel the delivery vehicle would expend by altering the assigned vehicle route to deliver the item to the alternative destination is greater than a threshold amount of fuel, initiating a plan to handoff the item to a service provider for delivery to the alternative destination;
monitoring, based at least in part on location data received from the vehicle, the current location of the vehicle relative to the assigned vehicle route to identify preassigned vehicle stops on an untraversed portion of the assigned vehicle route;
monitoring, the current location of one or more service providers;
identifying, one or more potential meet locations and corresponding potential meet times, wherein the potential meet locations are limited to the preassigned vehicle stops located along the untraversed portion of the assigned vehicle route and the corresponding potential meet times are each identified based at least in part on an estimated time of arrival of the vehicle at the one or more potential meet locations while factoring in a time taken to make preassigned vehicle stops as the vehicle travels along the untraversed portion of the assigned vehicle route;
comparing the received service provider location data against the one or more potential meet locations and corresponding meet times to identify one or more eligible service providers, wherein the eligible service providers are identified as capable of traveling to at least one potential meet location by a corresponding potential meet time;
electronically communicating with a service provider computing entity associated with one of the eligible service providers to engage the eligible service provider to perform the requested service for the item;
transmitting one or more signals to the vehicle and the mobile computing entity carried by the engaged service provider indicating a meet location and corresponding meet time identified as one of the potential meet locations for which the engaged service provider is capable of traveling to by the corresponding potential meet time;
transferring the item to the engaged service provider based on the indicated meet location and meet time; and
receiving photographic evidence from the engaged service provider indicating a completed delivery of the item.

2. The method for engaging a service provider to perform a location-specific service involving an item of claim 1, further comprising using identity verification data configured to enable a virtual handshake between the delivery vehicle and the service provider computing entity carried by the engaged service provider.

3. The method for engaging a service provider to perform a location-specific service involving an item of claim 1, further comprising:
receiving data indicating that the item has been transferred to the engaged service provider; and
monitoring the location of the engaged service provider while the engaged service provider transports the item.

4. The method for engaging a service provider to perform a location-specific service involving an item of claim 1, wherein transmitting one or more signals to the delivery vehicle comprises steps for transmitting one or more signals to a mobile computing entity carried by a delivery vehicle operator associated with the delivery vehicle.

5. The method for engaging a service provider to perform a location-specific service involving an item of claim 1, wherein monitoring the location of one or more available service providers comprises:
querying a database of item data corresponding to a plurality of items to identify characteristics of the item;
querying a database of available service providers based at least in part on a portion of the item data for the item to identify one or more service providers qualified to perform the requested service involving the item; and
monitoring the location of one or more available service providers qualified to perform the requested service involving the item.

6. A system for engaging a service provider to perform a location-specific service involving an item, the system comprising one or more memory storage areas and one or more computer processors, the system configured to:
receiving a request to deliver an item located on a vehicle traversing an assigned vehicle route to an alternative destination, wherein an initial destination for the item is on the assigned vehicle route;
in response to determining that an amount of additional fuel the delivery vehicle would expend by altering the assigned vehicle route to deliver the item to the alternative destination is greater than a threshold amount of fuel, initiating a plan to handoff the item to a service provider for delivery to the alternative destination;
monitor, based at least in part on location data received from the vehicle, the current location of the vehicle relative to the assigned vehicle route to identify preassigned vehicle stops on an untraversed portion of the assigned vehicle route;
monitor, the current location of one or more service providers;
based at least in part on the identified untraversed portion of the assigned vehicle route, identify, one or more potential meet locations and corresponding potential meet times, wherein the potential meet locations are limited to the preassigned vehicle stops located along the untraversed portion of the assigned vehicle route and the corresponding potential meet times are each identified based at least in part on an estimated time of arrival of the vehicle at the one or more potential meet locations while factoring in a time taken to make preassigned vehicle stops as the vehicle travels along the untraversed portion of the assigned vehicle route delivering packages;

compare the received service provider location data against the one or more potential meet locations and corresponding meet times to identify one or more eligible service providers, wherein the eligible service providers are identified as capable of traveling to at least one potential meet location by a corresponding potential meet time;

electronically communicate with a service provider computing entity associated with one of the eligible service providers to engage the eligible service provider to perform the requested service for the item;

transmit one or more signals to the vehicle and the mobile computing entity carried by the engaged service provider indicating a meet location and corresponding meet time identified as one of the potential meet locations for which the engaged service provider is capable of traveling to by the corresponding potential meet time; and transferring the item to the engaged service provider based on the indicated meet location and meet time.

7. The system for engaging a service provider to perform a location-specific service involving an item of claim 6, further comprising using identity verification data configured to enable a virtual handshake between the delivery vehicle and the service provider computing entity carried by the engaged service provider.

8. The system for engaging a service provider to perform a location-specific service involving an item of claim 6, further configured to:
receive data indicating that the item has been transferred to the engaged service provider; and
monitor the location of the engaged service provider while the engaged service provider transports the item.

9. The system for engaging a service provider to perform a location-specific service involving an item of claim 6, wherein the threshold criteria is an amount of additional elapsed time the delivery vehicle would take when altering the assigned vehicle route to deliver the item to the alternative destination.

10. The system for engaging a service provider to perform a location-specific service involving an item of claim 6, wherein transmitting one or more signals to the delivery vehicle comprises transmitting one or more signals to a mobile computing entity carried by a delivery vehicle operator associated with the delivery vehicle.

11. The system for engaging a service provider to perform a location-specific service involving an item of claim 6, wherein monitoring the location of one or more available service providers comprises:
querying a database of item data corresponding to a plurality of items to identify characteristics of the item;
querying a database of available service providers based at least in part on a portion of the item data for the item to identify one or more service providers qualified to perform the requested service involving the item; and
monitoring the location of one or more available service providers qualified to perform the requested service involving the item.

12. A computer program product comprising at least one non-transitory computer-readable storage medium having computer-readable program code portions stored therein, the computer readable program code portions comprising:
an executable portion configured for receiving a request to deliver an item located on a vehicle traversing an assigned vehicle route to an alternative destination, wherein an initial destination for the item is on the assigned vehicle route;
an executable portion configured for, in response to determining that the an amount of additional fuel the delivery vehicle would expend by altering the assigned vehicle route to deliver the item to the alternative destination is greater than a threshold amount of fuel, initiating a plan to handoff the item to a service provider for delivery to the alternative destination;
an executable portion configured for monitoring, based at least in part on location data received from the vehicle, the current location of the vehicle relative to the assigned vehicle route to identify preassigned vehicle stops on an untraversed portion of the assigned vehicle route;
an executable portion configured for monitoring the current location of one or more service providers;
an executable portion configured for, based at least in part on the identified untraversed portion of the assigned vehicle route, identifying one or more potential meet locations and corresponding potential meet times, wherein the potential meet locations are limited to the preassigned vehicle stops located along the untraversed portion of the assigned vehicle route and the corresponding potential meet times are each identified based at least in part on an estimated time of arrival of the vehicle at the one or more potential meet locations while factoring in a time taken to make preassigned vehicle stops as the vehicle travels along the untraversed portion of the assigned vehicle route;
an executable portion configured for comparing the received service provider location data against the one or more potential meet locations and corresponding meet times to identify one or more eligible service providers, wherein the eligible service providers are identified as capable of traveling to at least one potential meet location by a corresponding potential meet time;
an executable portion configured for electronically communicating with a service provider computing entity associated with one of the eligible service providers to engage the eligible service provider to perform the requested service for the item;
an executable portion configured for transmitting one or more signals to the vehicle and the mobile computing entity carried by the engaged service provider indicating a meet location and corresponding meet time identified as one of the potential meet locations for which the engaged service provider is capable of traveling to by the corresponding potential meet time; and
transferring the item to the engaged service provider based on the indicated meet location and meet time.

13. The computer program product of claim 12, further comprising using identity verification data configured to enable a virtual handshake between the delivery vehicle and the service provider computing entity carried by the engaged service provider.

14. The computer program product of claim 12, further comprising:
- an executable portion configured for receiving data indicating that the item has been transferred to the engaged service provider; and
- an executable portion configured for monitoring the location of the engaged service provider while the engaged service provider transports the item.

15. The computer program product of claim 12, wherein transmitting one or more signals to the delivery vehicle comprises steps for transmitting one or more signals to a mobile computing entity carried by a delivery vehicle operator associated with the delivery vehicle.

16. The computer program product of claim 12, wherein monitoring the location of one or more available service providers comprises:
- querying a database of item data corresponding to a plurality of items to identify characteristics of the item;
- querying a database of available service providers based at least in part on a portion of the item data for the item to identify one or more service providers qualified to perform the requested service involving the item; and
- monitoring the location of one or more available service providers qualified to perform the requested service involving the item.

* * * * *

UNITED STATES PATENT AND TRADEMARK OFFICE
CERTIFICATE OF CORRECTION

PATENT NO. : 11,157,863 B2
APPLICATION NO. : 15/412964
DATED : October 26, 2021
INVENTOR(S) : Juan Perez Page 1 of 1

It is certified that error appears in the above-identified patent and that said Letters Patent is hereby corrected as shown below:

In the Claims

In Column 42, Line 11, Claim 12, after "that" delete "the".

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*